United States Patent
Robertson et al.

(10) Patent No.: US 8,230,470 B2
(45) Date of Patent: *Jul. 24, 2012

(54) FULL DUPLEX WIDEBAND COMMUNICATIONS SYSTEM FOR A LOCAL COAXIAL NETWORK

(76) Inventors: Neil C. Robertson, Lilburn, GA (US); Jose M. Fernandez, Lilburn, GA (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/036,329

(22) Filed: Feb. 25, 2008

(65) Prior Publication Data

US 2008/0148325 A1 Jun. 19, 2008

Related U.S. Application Data

(60) Division of application No. 10/924,077, filed on Aug. 23, 2004, and a continuation-in-part of application No. 10/342,670, filed on Jan. 15, 2003.

(51) Int. Cl.
| | |
|---|---|
| *H04N 7/173* | (2011.01) |
| *H04N 7/18* | (2006.01) |
| *H04L 5/14* | (2006.01) |
| *H04J 3/16* | (2006.01) |

(52) U.S. Cl. .............. 725/93; 725/78; 725/85; 725/111; 370/295; 370/437

(58) Field of Classification Search .................... 725/74, 725/78, 82, 85, 105, 126, 127–129, 133, 725/135, 141, 143, 149, 153, 111; 386/34, 386/36, 41, 122; 455/135; 370/463–464
See application file for complete search history.

(56) References Cited

U.S. PATENT DOCUMENTS

| | | | |
|---|---|---|---|
| 4,215,366 | A | 7/1980 | Davidson |
| 4,290,081 | A | 9/1981 | Foerster |
| 4,439,784 | A | 3/1984 | Furukawa et al. |
| 4,535,355 | A | 8/1985 | Arn et al. |
| 4,540,958 | A | 9/1985 | Neyens et al. |
| 4,578,533 | A | 3/1986 | Pierce |

(Continued)

FOREIGN PATENT DOCUMENTS

CA 2501107 1/2011

(Continued)

OTHER PUBLICATIONS

Kerr, G., "A Review of Fully Interactive Video on Demand" Signal Processing Image Communication, Elsevier Science Publishers, Amsterdam, NL, vol. 8, No. 3, Apr. 1996, pp. 173-190, XP004047063 ISSN: 09235965.

(Continued)

*Primary Examiner* — Hai V Tran

(74) *Attorney, Agent, or Firm* — Merchant & Gould

(57) ABSTRACT

Systems and methods are disclosed for a full duplex wideband communications system for a local (e.g. in-home) coaxial network. The system employs a Frequency-division duplex (FDD) scheme that allows identical wideband modems to communicate with each other. To achieve this, the wideband modems contain a duplexer and a switch that allows reversing the connection of the wideband transmitter and receiver to the duplexer. Each wideband modem includes a control modem that is used to control access to the wideband channels. A wideband transmitter, which may be included in a modem associated with a server set-top terminal (STT), transmits a video presentation to a wideband receiver, which may be included in a modem associated with a client STT.

12 Claims, 5 Drawing Sheets

U.S. PATENT DOCUMENTS

| | | | |
|---|---|---|---|
| 4,644,526 A | 2/1987 | Wu | 370/295 |
| 4,686,564 A | 8/1987 | Masuko et al. | |
| 4,706,121 A | 11/1987 | Young | |
| 4,751,578 A | 6/1988 | Reiter et al. | |
| 4,885,803 A | 12/1989 | Hermann et al. | |
| 4,907,079 A | 3/1990 | Turner et al. | |
| 4,908,713 A | 3/1990 | Levine | |
| 4,916,532 A | 4/1990 | Streck et al. | |
| 4,963,994 A | 10/1990 | Levine | |
| 4,963,995 A | 10/1990 | Lang | |
| 5,010,299 A | 4/1991 | Nishizawa et al. | |
| 5,010,399 A | 4/1991 | Goodman et al. | |
| 5,038,211 A | 8/1991 | Hallenbeck | |
| 5,048,054 A | 9/1991 | Eyuboglu et al. | |
| 5,155,591 A | 10/1992 | Wachob | 725/35 |
| 5,168,372 A | 12/1992 | Sweetser | 725/29 |
| 5,251,074 A | 10/1993 | Hamma et al. | |
| 5,253,066 A | 10/1993 | Vogel | |
| 5,293,357 A | 3/1994 | Hallenbeck | |
| 5,294,981 A | 3/1994 | Yazolino et al. | |
| 5,381,449 A | 1/1995 | Jasper et al. | 375/298 |
| 5,406,626 A | 4/1995 | Ryan | |
| 5,412,416 A | 5/1995 | Nemirofsky | |
| 5,479,268 A | 12/1995 | Young et al. | |
| 5,481,542 A | 1/1996 | Logston et al. | |
| 5,508,815 A | 4/1996 | Levine | |
| 5,515,377 A | 5/1996 | Home et al. | |
| 5,524,051 A | 6/1996 | Ryan | |
| 5,553,211 A | 9/1996 | Uotani | |
| 5,568,272 A | 10/1996 | Levine | |
| 5,574,964 A | 11/1996 | Hamlin | |
| 5,579,308 A | 11/1996 | Humpleman | |
| 5,590,195 A | 12/1996 | Ryan | |
| 5,600,364 A | 2/1997 | Hendricks et al. | |
| 5,600,573 A | 2/1997 | Hendricks et al. | |
| 5,600,707 A | 2/1997 | Miller, II | |
| 5,621,793 A | 4/1997 | Bednarek et al. | |
| 5,636,247 A | 6/1997 | Kamerman et al. | 375/260 |
| 5,638,423 A | 6/1997 | Grube et al. | |
| 5,642,384 A | 6/1997 | Ramesh | 375/265 |
| 5,652,772 A | 7/1997 | Isaksson et al. | 375/367 |
| 5,657,072 A | 8/1997 | Aristides et al. | |
| 5,666,151 A | 9/1997 | Kondo et al. | |
| 5,682,206 A | 10/1997 | Wehmeyer et al. | |
| 5,699,105 A | 12/1997 | Chen et al. | |
| 5,701,383 A | 12/1997 | Russo et al. | |
| 5,708,961 A | 1/1998 | Hylton et al. | |
| 5,714,945 A | 2/1998 | Sakuma et al. | |
| 5,715,020 A | 2/1998 | Kuroiwa et al. | |
| 5,715,277 A | 2/1998 | Goodson et al. | |
| 5,732,359 A | 3/1998 | Baranowsky et al. | 455/552.1 |
| 5,734,437 A | 3/1998 | Back | |
| 5,751,806 A | 5/1998 | Ryan | |
| 5,758,257 A | 5/1998 | Herz et al. | |
| 5,760,822 A | 6/1998 | Coutinho | |
| 5,774,527 A | 6/1998 | Handelman et al. | |
| 5,778,181 A | 7/1998 | Hidary et al. | |
| 5,787,472 A | 7/1998 | Dan et al. | |
| 5,793,413 A | 8/1998 | Hylton et al. | |
| 5,793,414 A | 8/1998 | Shaffer | |
| 5,796,442 A | 8/1998 | Gove et al. | |
| 5,801,787 A | 9/1998 | Schein et al. | |
| 5,805,763 A | 9/1998 | Lawler et al. | |
| 5,808,659 A | 9/1998 | Coutinho et al. | |
| 5,809,204 A | 9/1998 | Young et al. | |
| 5,815,794 A | 9/1998 | Williams | |
| 5,828,403 A | 10/1998 | DeRodeff et al. | |
| 5,835,128 A | 11/1998 | MacDonald et al. | |
| 5,835,602 A | 11/1998 | Lang | 380/268 |
| 5,838,873 A | 11/1998 | Blatter et al. | 386/95 |
| 5,850,218 A | 12/1998 | LaJoie et al. | |
| 5,850,340 A | 12/1998 | York | 700/83 |
| 5,851,149 A | 12/1998 | Xidos et al. | |
| 5,867,485 A | 2/1999 | Chambers et al. | |
| 5,872,644 A | 2/1999 | Yamazaki et al. | |
| 5,883,677 A | 3/1999 | Hofmann | 348/584 |
| 5,886,732 A | 3/1999 | Humpleman | |
| 5,886,753 A | 3/1999 | Shinyagaito et al. | |
| 5,915,068 A | 6/1999 | Levine | |
| 5,920,801 A | 7/1999 | Thomas et al. | |
| 5,930,247 A | 7/1999 | Miller, II et al. | |
| 5,936,660 A | 8/1999 | Gurantz | |
| 5,940,073 A | 8/1999 | Klosterman et al. | |
| 5,940,387 A | 8/1999 | Humpleman | |
| 5,970,053 A | 10/1999 | Schick et al. | 370/252 |
| 5,970,386 A | 10/1999 | Williams | |
| 5,983,068 A | 11/1999 | Tomich et al. | |
| 5,990,927 A | 11/1999 | Hendricks et al. | |
| 5,995,258 A | 11/1999 | Weber et al. | |
| 5,999,622 A | 12/1999 | Yasukawa et al. | 705/51 |
| 6,005,861 A | 12/1999 | Humpleman | |
| 6,005,876 A | 12/1999 | Cimini, Jr. et al. | 370/525 |
| 6,006,257 A | 12/1999 | Slezak | |
| 6,014,546 A | 1/2000 | Georges et al. | |
| 6,018,768 A | 1/2000 | Ullman et al. | |
| 6,023,603 A | 2/2000 | Matsubara | 455/3.2 |
| 6,026,150 A | 2/2000 | Frank | |
| 6,037,998 A | 3/2000 | Usui et al. | |
| 6,052,556 A | 4/2000 | Sampsell | |
| 6,055,355 A | 4/2000 | Lee | |
| 6,061,449 A | 5/2000 | Candelore et al. | |
| 6,069,621 A | 5/2000 | Schupak | 715/717 |
| 6,073,122 A | 6/2000 | Wool | |
| 6,091,320 A | 7/2000 | Odinak | |
| 6,091,767 A | 7/2000 | Westerman | 375/240 |
| 6,100,883 A | 8/2000 | Hoarty | |
| 6,100,936 A | 8/2000 | Jordan et al. | |
| 6,115,456 A | 9/2000 | Nolde | 379/102.01 |
| 6,118,873 A | 9/2000 | Lotspiech et al. | |
| 6,119,154 A | 9/2000 | Weaver et al. | 709/219 |
| 6,122,482 A | 9/2000 | Green, Sr. et al. | 455/3.2 |
| 6,125,103 A | 9/2000 | Bauml et al. | 370/203 |
| 6,133,912 A | 10/2000 | Montero | 715/716 |
| 6,151,493 A | 11/2000 | Sasakura et al. | |
| 6,166,744 A | 12/2000 | Jaszlics et al. | |
| 6,169,543 B1 | 1/2001 | Wehmeyer | |
| 6,172,712 B1 | 1/2001 | Beard | |
| 6,175,343 B1 | 1/2001 | Mitchell et al. | |
| 6,175,551 B1 | 1/2001 | Awater et al. | 370/210 |
| 6,177,931 B1 | 1/2001 | Alexander et al. | |
| 6,177,963 B1 | 1/2001 | Foye et al. | |
| 6,181,784 B1 | 1/2001 | Duran et al. | |
| 6,182,287 B1 | 1/2001 | Schneidewend et al. | |
| 6,188,700 B1 | 2/2001 | Kato et al. | 370/477 |
| 6,202,211 B1 | 3/2001 | Williams, Jr. | |
| 6,208,669 B1 | 3/2001 | Cimini, Jr. et al. | 370/525 |
| 6,215,526 B1 | 4/2001 | Barton et al. | |
| 6,219,839 B1 | 4/2001 | Sampsell | |
| 6,229,895 B1 | 5/2001 | Son et al. | 424/427 |
| 6,230,162 B1 | 5/2001 | Kumar et al. | 707/104.1 |
| 6,233,389 B1 | 5/2001 | Barton et al. | |
| 6,236,653 B1 | 5/2001 | Dalton et al. | |
| 6,240,555 B1 | 5/2001 | Daniel et al. | |
| 6,243,142 B1 | 6/2001 | Mugura et al. | |
| 6,263,503 B1 | 7/2001 | Margulis | |
| 6,285,746 B1 | 9/2001 | Duran et al. | |
| 6,286,140 B1 | 9/2001 | Ivanyi | 725/14 |
| 6,286,142 B1* | 9/2001 | Ehreth | 725/78 |
| 6,305,017 B1 | 10/2001 | Satterfield | |
| 6,310,886 B1 | 10/2001 | Barton | |
| 6,314,146 B1 | 11/2001 | Tellado et al. | 375/346 |
| 6,317,884 B1 | 11/2001 | Eames et al. | |
| 6,324,338 B1 | 11/2001 | Wood et al. | |
| 6,327,418 B1 | 12/2001 | Barton | |
| 6,330,334 B1 | 12/2001 | Ryan | |
| 6,333,937 B1 | 12/2001 | Ryan | 370/468 |
| 6,353,929 B1 | 3/2002 | Houston | |
| 6,356,309 B1 | 3/2002 | Masaki et al. | 348/439.1 |
| 6,377,552 B1 | 4/2002 | Moran et al. | |
| 6,377,782 B1 | 4/2002 | Bishop et al. | |
| 6,378,130 B1 | 4/2002 | Adams | 725/95 |
| 6,411,820 B1 | 6/2002 | Margarit et al. | |
| 6,415,031 B1 | 7/2002 | Colligan et al. | |
| 6,418,558 B1 | 7/2002 | Roberts et al. | |
| 6,421,706 B1 | 7/2002 | McNeill et al. | |
| 6,424,947 B1 | 7/2002 | Tsuria et al. | |
| 6,438,165 B2 | 8/2002 | Normile | 375/240 |

| Patent No. | Date | Inventor | Class |
|---|---|---|---|
| 6,441,832 B1 | 8/2002 | Tao et al. | |
| 6,442,755 B1 | 8/2002 | Lemmons et al. | |
| 6,452,923 B1 | 9/2002 | Gerszberg et al. | |
| 6,459,427 B1 | 10/2002 | Mao et al. | 725/109 |
| 6,473,559 B1 | 10/2002 | Knudson et al. | |
| 6,481,013 B1 | 11/2002 | Dinwiddie et al. | |
| 6,483,548 B1 | 11/2002 | Allport | |
| 6,493,875 B1 | 12/2002 | Eames et al. | |
| 6,496,980 B1 | 12/2002 | Tillman et al. | |
| 6,505,348 B1 | 1/2003 | Knowles et al. | |
| 6,516,029 B1 | 2/2003 | Wang | |
| 6,526,581 B1 | 2/2003 | Edson | |
| 6,530,085 B1 | 3/2003 | Perlman | |
| 6,535,717 B1 | 3/2003 | Matsushima et al. | |
| 6,536,041 B1 | 3/2003 | Knudson et al. | |
| 6,542,610 B2 | 4/2003 | Traw et al. | |
| 6,556,557 B1 | 4/2003 | Cimini, Jr. et al. | 370/342 |
| 6,567,981 B1 | 5/2003 | Jeffrey | |
| 6,578,070 B1 | 6/2003 | Weaver et al. | |
| 6,588,017 B1 | 7/2003 | Calderone | |
| 6,594,798 B1 | 7/2003 | Chou et al. | |
| 6,614,936 B1 | 9/2003 | Wu et al. | |
| 6,622,304 B1 | 9/2003 | Carhart | |
| 6,622,307 B1 | 9/2003 | Ho | |
| 6,631,522 B1 | 10/2003 | Erdelyi | 725/53 |
| 6,637,031 B1 | 10/2003 | Chou | |
| 6,675,385 B1 | 1/2004 | Wang | 725/39 |
| 6,681,326 B2 | 1/2004 | Son et al. | |
| 6,697,426 B1 | 2/2004 | Van Der Schaar et al. | |
| 6,697,489 B1 | 2/2004 | Candelore | |
| 6,704,028 B2 | 3/2004 | Wugofski | |
| 6,711,132 B2 | 3/2004 | Lazarus | |
| 6,735,221 B1 | 5/2004 | Cherubini | |
| 6,735,312 B1 | 5/2004 | Abdalla et al. | 380/239 |
| 6,754,905 B2 | 6/2004 | Gordon et al. | |
| 6,756,997 B1 | 6/2004 | Ward et al. | |
| 6,757,906 B1 | 6/2004 | Look et al. | |
| 6,766,526 B1 | 7/2004 | Ellis | |
| 6,769,127 B1 | 7/2004 | Bonomi et al. | 725/39 |
| 6,771,908 B2 | 8/2004 | Eijk et al. | |
| 6,785,258 B1 | 8/2004 | Garcia, Jr. et al. | 370/344 |
| 6,785,901 B1 | 8/2004 | Horowitz et al. | 725/25 |
| 6,788,740 B1 | 9/2004 | van der Schaar et al. | 375/240 |
| 6,789,106 B2 | 9/2004 | Eyer et al. | |
| 6,791,995 B1 | 9/2004 | Azenkot et al. | |
| 6,795,205 B1 | 9/2004 | Gacek | |
| 6,798,838 B1 | 9/2004 | Ngo | 375/240.19 |
| 6,804,357 B1 | 10/2004 | Ikonen et al. | |
| 6,816,194 B2 | 11/2004 | Zhang et al. | |
| 6,816,904 B1 | 11/2004 | Ludwig et al. | 709/226 |
| 6,845,486 B2 | 1/2005 | Yamada et al. | |
| 6,864,778 B2 | 3/2005 | Musschebroeck et al. | 340/3.41 |
| 6,868,292 B2 | 3/2005 | Ficco et al. | |
| 6,870,570 B1 | 3/2005 | Bowser | |
| 6,889,385 B1 | 5/2005 | Rakib et al. | |
| 6,904,522 B1 | 6/2005 | Benardeau et al. | |
| 6,915,529 B1 | 7/2005 | Suematsu et al. | |
| 6,922,843 B1 | 7/2005 | Herrington et al. | 725/30 |
| 6,930,788 B1 | 8/2005 | Iwamoto et al. | |
| 6,941,515 B1 | 9/2005 | Wilkins | |
| 6,950,623 B2 | 9/2005 | Brown et al. | |
| 6,954,897 B1 | 10/2005 | Noguchi et al. | |
| 6,957,344 B1 | 10/2005 | Goldshlag et al. | |
| 6,970,539 B2 | 11/2005 | Yamamoto et al. | 379/102.05 |
| 6,978,474 B1 | 12/2005 | Sheppard et al. | 725/83 |
| 6,996,623 B1 | 2/2006 | Kawano et al. | |
| 6,996,837 B1 | 2/2006 | Miura et al. | |
| 7,020,890 B1 | 3/2006 | Suematsu et al. | |
| 7,020,892 B2 | 3/2006 | Levesque et al. | 725/89 |
| 7,039,169 B2 | 5/2006 | Jones | 379/93.02 |
| 7,039,245 B1 | 5/2006 | Hamery | |
| 7,039,938 B2 | 5/2006 | Candelore | 725/87 |
| 7,042,526 B1 | 5/2006 | Borseth | |
| 7,047,305 B1 | 5/2006 | Brooks et al. | |
| 7,054,289 B1 | 5/2006 | Foster et al. | |
| 7,065,781 B1 | 6/2006 | Entwistle | 725/135 |
| 7,072,945 B1 | 7/2006 | Nieminen et al. | 709/217 |
| 7,093,295 B1 | 8/2006 | Saito | |
| 7,114,174 B1 | 9/2006 | Brooks et al. | 725/105 |
| 7,116,894 B1 | 10/2006 | Chatterton | |
| 7,127,734 B1 | 10/2006 | Amit | |
| 7,130,576 B1 | 10/2006 | Gurantz et al. | 455/3.02 |
| 7,139,398 B2 | 11/2006 | Candelore et al. | 380/200 |
| 7,140,033 B1 | 11/2006 | Durden et al. | |
| 7,143,296 B2 | 11/2006 | Hirata | |
| 7,146,628 B1 | 12/2006 | Gordon et al. | |
| 7,155,012 B2 | 12/2006 | Candelore et al. | |
| 7,184,550 B2 | 2/2007 | Graunke | |
| 7,185,095 B2 | 2/2007 | Kawamoto et al. | |
| 7,190,901 B2 | 3/2007 | Farmer et al. | 398/67 |
| 7,194,558 B2 | 3/2007 | Kawamoto et al. | |
| 7,209,667 B2 | 4/2007 | Lindblad | |
| 7,222,358 B2 | 5/2007 | Levinson et al. | |
| 7,231,516 B1 | 6/2007 | Sparrell et al. | 713/156 |
| 7,233,669 B2 | 6/2007 | Candelore | |
| 7,234,155 B1 | 6/2007 | Kay et al. | 725/60 |
| 7,260,829 B1 | 8/2007 | Hendricks et al. | |
| 7,278,154 B2 | 10/2007 | Harrison et al. | |
| 7,305,700 B2 | 12/2007 | Boynton et al. | 726/4 |
| 7,310,355 B1 | 12/2007 | Krein et al. | |
| 7,313,811 B1 | 12/2007 | Sheppard et al. | |
| 7,336,787 B2 | 2/2008 | Unger et al. | 380/217 |
| 7,346,120 B2 | 3/2008 | McCorkle | 375/295 |
| 7,346,134 B2 | 3/2008 | Smith | 375/346 |
| 7,350,225 B2 | 3/2008 | Ovadia | |
| 7,360,233 B2 | 4/2008 | Russ et al. | |
| 7,360,235 B2 | 4/2008 | Davies et al. | 725/133 |
| 7,366,914 B2 | 4/2008 | Graunke | 713/190 |
| 7,392,389 B2 | 6/2008 | Kori | 713/170 |
| 7,434,246 B2 | 10/2008 | Florence | 725/46 |
| 7,487,532 B2 | 2/2009 | Robertson et al. | 725/111 |
| 7,489,924 B2 | 2/2009 | Choi | |
| 7,516,470 B2 | 4/2009 | Russ et al. | 725/48 |
| 7,545,935 B2 | 6/2009 | Claussen et al. | 380/200 |
| 7,574,723 B2 | 8/2009 | Putterman et al. | |
| 7,603,684 B1 | 10/2009 | Ellis | 725/39 |
| 7,673,314 B2 | 3/2010 | Ellis et al. | 725/46 |
| 7,849,486 B2 | 12/2010 | Russ et al. | |
| 7,861,272 B2 | 12/2010 | Russ et al. | |
| 7,870,584 B2 | 1/2011 | Russ et al. | |
| 7,876,998 B2 | 1/2011 | Wall et al. | |
| 7,908,625 B2 | 3/2011 | Robertson et al. | |
| 8,046,806 B2 | 10/2011 | Wall et al. | 725/78 |
| 8,094,640 B2 | 1/2012 | Robertson et al. | 370/343 |
| 8,127,326 B2 | 2/2012 | Claussen et al. | 725/25 |
| 2001/0005906 A1 | 6/2001 | Humpleman | |
| 2001/0011373 A1 | 8/2001 | Inoue | 725/50 |
| 2001/0017920 A1 | 8/2001 | Son et al. | |
| 2001/0025375 A1 | 9/2001 | Ahmad et al. | |
| 2001/0030664 A1 | 10/2001 | Shulman et al. | |
| 2001/0039660 A1 | 11/2001 | Vasilevsky et al. | |
| 2002/0002707 A1 | 1/2002 | Ekel et al. | |
| 2002/0007485 A1 | 1/2002 | Rodriguez et al. | |
| 2002/0007493 A1 | 1/2002 | Butler et al. | |
| 2002/0010936 A1 | 1/2002 | Adam | 725/91 |
| 2002/0019984 A1 | 2/2002 | Rakib | |
| 2002/0035726 A1 | 3/2002 | Corl | |
| 2002/0035729 A1 | 3/2002 | Diep | |
| 2002/0040475 A1 | 4/2002 | Yap et al. | |
| 2002/0044762 A1 | 4/2002 | Wood et al. | |
| 2002/0051200 A1 | 5/2002 | Chang et al. | |
| 2002/0051581 A1 | 5/2002 | Takeuchi et al. | |
| 2002/0056112 A1 | 5/2002 | Dureau et al. | |
| 2002/0059584 A1 | 5/2002 | Ferman et al. | |
| 2002/0059615 A1 | 5/2002 | Okawara et al. | |
| 2002/0059617 A1 | 5/2002 | Terakado et al. | |
| 2002/0059623 A1 | 5/2002 | Rodriguez et al. | 725/91 |
| 2002/0059637 A1 | 5/2002 | Rakib | |
| 2002/0059642 A1 | 5/2002 | Russ et al. | 725/135 |
| 2002/0066101 A1 | 5/2002 | Gordon et al. | |
| 2002/0067437 A1 | 6/2002 | Tsubouchi et al. | |
| 2002/0069417 A1* | 6/2002 | Kliger et al. | 725/78 |
| 2002/0083438 A1 | 6/2002 | So et al. | |
| 2002/0087996 A1 | 7/2002 | Bi et al. | |
| 2002/0090198 A1 | 7/2002 | Rosenberg et al. | |
| 2002/0095673 A1 | 7/2002 | Leung et al. | |
| 2002/0095689 A1 | 7/2002 | Novak | |
| 2002/0100041 A1 | 7/2002 | Rosenberg et al. | |

| | | |
|---|---|---|
| 2002/0104001 A1 | 8/2002 | Lotspiech et al. |
| 2002/0108109 A1 | 8/2002 | Harris et al. ..................... 725/32 |
| 2002/0108121 A1 | 8/2002 | Alao et al. |
| 2002/0116626 A1 | 8/2002 | Wood |
| 2002/0122045 A1 | 9/2002 | Woodson et al. |
| 2002/0133558 A1 | 9/2002 | Fenno et al. |
| 2002/0137517 A1 | 9/2002 | Williams et al. |
| 2002/0138830 A1 | 9/2002 | Nagaoka et al. |
| 2002/0141582 A1 | 10/2002 | Kocher et al. |
| 2002/0144262 A1 | 10/2002 | Plotnick et al. |
| 2002/0146237 A1 | 10/2002 | Safadi |
| 2002/0154892 A1 | 10/2002 | Hoshen et al. |
| 2002/0157112 A1 | 10/2002 | Kuhn |
| 2002/0166124 A1 | 11/2002 | Gurantz et al. |
| 2002/0174430 A1 | 11/2002 | Ellis et al. |
| 2002/0174433 A1* | 11/2002 | Baumgartner et al. ......... 725/58 |
| 2002/0174444 A1 | 11/2002 | Gatto et al. |
| 2002/0178445 A1 | 11/2002 | Eldering |
| 2002/0187779 A1 | 12/2002 | Freeny |
| 2002/0194596 A1 | 12/2002 | Srivastava |
| 2002/0196941 A1 | 12/2002 | Isaacson et al. .............. 380/231 |
| 2002/0198762 A1 | 12/2002 | Donato ............................ 705/10 |
| 2002/0199188 A1 | 12/2002 | Sie et al. |
| 2003/0005300 A1 | 1/2003 | Noble et al. |
| 2003/0005452 A1 | 1/2003 | Rodriguez ....................... 725/86 |
| 2003/0009763 A1 | 1/2003 | Crinon et al. |
| 2003/0014750 A1 | 1/2003 | Kamen ........................... 725/25 |
| 2003/0026423 A1 | 2/2003 | Unger et al. |
| 2003/0028886 A1 | 2/2003 | Wang et al. |
| 2003/0028890 A1 | 2/2003 | Swart et al. |
| 2003/0044165 A1 | 3/2003 | Wood et al. |
| 2003/0063003 A1 | 4/2003 | Bero et al. |
| 2003/0063814 A1 | 4/2003 | Herley |
| 2003/0069964 A1 | 4/2003 | Shteyn et al. .................. 709/225 |
| 2003/0074565 A1 | 4/2003 | Wasilewski et al. .......... 713/182 |
| 2003/0097563 A1 | 5/2003 | Moroney et al. |
| 2003/0097655 A1 | 5/2003 | Novak |
| 2003/0097662 A1 | 5/2003 | Russ et al. .................... 725/132 |
| 2003/0108199 A1 | 6/2003 | Pinder et al. |
| 2003/0108336 A1 | 6/2003 | Schramel |
| 2003/0113100 A1 | 6/2003 | Hecht et al. ..................... 386/83 |
| 2003/0123664 A1 | 7/2003 | Pedlow, Jr. et al. |
| 2003/0135859 A1 | 7/2003 | Putterman et al. ............... 725/78 |
| 2003/0142664 A1 | 7/2003 | Gerszberg et al. |
| 2003/0145336 A1 | 7/2003 | Matsuzaki et al. |
| 2003/0149986 A1 | 8/2003 | Mayfield et al. |
| 2003/0149991 A1 | 8/2003 | Reidhead et al. |
| 2003/0154477 A1 | 8/2003 | Hassell et al. |
| 2003/0159140 A1 | 8/2003 | Candelore |
| 2003/0159157 A1 | 8/2003 | Chan |
| 2003/0174048 A1 | 9/2003 | McCorkle |
| 2003/0177495 A1 | 9/2003 | Needham et al. |
| 2003/0181160 A1 | 9/2003 | Hirsch |
| 2003/0192047 A1 | 10/2003 | Gaul et al. ....................... 725/39 |
| 2003/0192061 A1 | 10/2003 | Hwangbo et al. ............. 725/138 |
| 2003/0202772 A1 | 10/2003 | Dow et al. |
| 2003/0204856 A1 | 10/2003 | Buxton |
| 2003/0207672 A1 | 11/2003 | Dang et al. |
| 2003/0233667 A1 | 12/2003 | Umipig et al. |
| 2003/0235308 A1 | 12/2003 | Boynton et al. ............... 380/270 |
| 2003/0237093 A1 | 12/2003 | Marsh ............................. 725/46 |
| 2004/0003393 A1 | 1/2004 | Gutta et al. ...................... 725/25 |
| 2004/0003398 A1 | 1/2004 | Donian et al. |
| 2004/0012717 A1 | 1/2004 | Sprague et al. ............... 348/564 |
| 2004/0017913 A1 | 1/2004 | Hawkes et al. ................. 380/37 |
| 2004/0025179 A1 | 2/2004 | Russ et al. ....................... 725/46 |
| 2004/0028216 A1 | 2/2004 | Freyman ................... 379/406.01 |
| 2004/0032902 A1 | 2/2004 | Koifman et al. |
| 2004/0032950 A1 | 2/2004 | Graunke |
| 2004/0034874 A1 | 2/2004 | Hord et al. |
| 2004/0040035 A1 | 2/2004 | Carlucci et al. |
| 2004/0049793 A1 | 3/2004 | Chou ............................... 725/87 |
| 2004/0051638 A1 | 3/2004 | Green |
| 2004/0054771 A1 | 3/2004 | Roe et al. |
| 2004/0060072 A1 | 3/2004 | Klein ............................. 725/127 |
| 2004/0064714 A1 | 4/2004 | Carr |
| 2004/0068739 A1 | 4/2004 | Russ et al. |
| 2004/0068747 A1 | 4/2004 | Robertson |
| 2004/0068752 A1 | 4/2004 | Parker ........................... 725/120 |
| 2004/0068753 A1 | 4/2004 | Robertson et al. ............ 725/126 |
| 2004/0068754 A1 | 4/2004 | Russ |
| 2004/0078825 A1 | 4/2004 | Murphy |
| 2004/0090971 A1 | 5/2004 | Anderson |
| 2004/0100897 A1 | 5/2004 | Shattil ............................ 370/206 |
| 2004/0104926 A1 | 6/2004 | Murray et al. |
| 2004/0107445 A1 | 6/2004 | Amit |
| 2004/0109497 A1 | 6/2004 | Koval |
| 2004/0111526 A1 | 6/2004 | Baldwin et al. ............... 709/231 |
| 2004/0117483 A1 | 6/2004 | Singer et al. .................. 709/225 |
| 2004/0117831 A1 | 6/2004 | Ellis et al. ........................ 725/53 |
| 2004/0128681 A1 | 7/2004 | Hancock |
| 2004/0128682 A1 | 7/2004 | Liga |
| 2004/0133911 A1 | 7/2004 | Russ et al. ....................... 725/69 |
| 2004/0163130 A1 | 8/2004 | Gray et al. .................... 725/132 |
| 2004/0172658 A1 | 9/2004 | Rakib et al. |
| 2004/0177369 A1 | 9/2004 | Akins, III ....................... 725/31 |
| 2004/0177381 A1* | 9/2004 | Kliger et al. .................. 725/131 |
| 2004/0220791 A1 | 11/2004 | Lamkin et al. |
| 2004/0221304 A1 | 11/2004 | Sparrell |
| 2004/0221308 A1 | 11/2004 | Cuttner et al. |
| 2004/0250272 A1 | 12/2004 | Durden et al. .................. 725/25 |
| 2004/0250273 A1 | 12/2004 | Swix et al. ...................... 725/25 |
| 2004/0255326 A1 | 12/2004 | Hicks et al. |
| 2004/0257976 A1 | 12/2004 | Alsobrook et al. |
| 2004/0261100 A1 | 12/2004 | Huber et al. |
| 2004/0261126 A1 | 12/2004 | Addington et al. |
| 2005/0004873 A1 | 1/2005 | Pou et al. ......................... 705/51 |
| 2005/0005287 A1 | 1/2005 | Claussen ......................... 725/31 |
| 2005/0022248 A1 | 1/2005 | Robertson et al. |
| 2005/0028190 A1 | 2/2005 | Rodriguez et al. |
| 2005/0028208 A1 | 2/2005 | Ellis et al. |
| 2005/0030910 A1 | 2/2005 | Robertson et al. ............ 370/276 |
| 2005/0042999 A1 | 2/2005 | Rappaport |
| 2005/0050557 A1 | 3/2005 | Gabryjelski et al. |
| 2005/0063422 A1 | 3/2005 | Lazar et al. |
| 2005/0065780 A1 | 3/2005 | Wiser et al. ................... 704/201 |
| 2005/0073945 A1 | 4/2005 | Garcia et al. .................. 370/206 |
| 2005/0076357 A1 | 4/2005 | Fenne ............................. 725/14 |
| 2005/0155052 A1 | 7/2005 | Ostrowska |
| 2005/0234992 A1 | 10/2005 | Haberman ................. 707/104.1 |
| 2005/0235323 A1 | 10/2005 | Ellis et al. |
| 2005/0251824 A1 | 11/2005 | Thomas et al. |
| 2005/0251827 A1 | 11/2005 | Ellis et al. |
| 2005/0262542 A1 | 11/2005 | DeWeese et al. |
| 2006/0010481 A1 | 1/2006 | Wall et al. ..................... 725/151 |
| 2006/0069645 A1 | 3/2006 | Chen et al. |
| 2006/0080360 A1 | 4/2006 | Young et al. .............. 707/104.1 |
| 2006/0095939 A1 | 5/2006 | Jutzi ................................ 725/78 |
| 2006/0117354 A1 | 6/2006 | Schutte et al. .................. 725/78 |
| 2006/0150225 A1 | 7/2006 | Hegg et al. ...................... 725/89 |
| 2006/0184967 A1 | 8/2006 | Maynard et al. ................ 725/46 |
| 2006/0218531 A1 | 9/2006 | Ostrowska et al. ............. 725/38 |
| 2006/0218591 A1 | 9/2006 | Billmaier et al. ............... 725/52 |
| 2006/0259584 A1 | 11/2006 | Watson et al. |
| 2007/0022307 A1 | 1/2007 | Ferrari |
| 2007/0077038 A1 | 4/2007 | Wall |
| 2007/0079341 A1 | 4/2007 | Russ et al. ....................... 725/89 |
| 2007/0094698 A1 | 4/2007 | Bountour et al. ............. 725/132 |
| 2007/0143776 A1 | 6/2007 | Russ et al. ....................... 725/14 |
| 2007/0300258 A1 | 12/2007 | O'Connor et al. .............. 725/44 |
| 2008/0066075 A1 | 3/2008 | Davies et al. .................. 719/321 |
| 2008/0072272 A1 | 3/2008 | Robertson et al. |
| 2008/0184327 A1 | 7/2008 | Ellis et al. |
| 2008/0201758 A1 | 8/2008 | Davies et al. .................. 725/133 |
| 2008/0271094 A1 | 10/2008 | Kliger et al. |
| 2008/0301738 A1 | 12/2008 | Davies et al. ................... 725/87 |
| 2009/0077586 A1 | 3/2009 | Wall et al. ....................... 725/39 |
| 2009/0083819 A1 | 3/2009 | Robertson et al. ............ 725/118 |
| 2009/0150922 A1 | 6/2009 | Russ et al. |
| 2009/0193452 A1 | 7/2009 | Russ et al. |
| 2009/0249176 A1 | 10/2009 | Jarman |
| 2010/0175093 A1 | 7/2010 | Arnold et al. |
| 2010/0313238 A1 | 12/2010 | Baumgartner et al. ........ 725/153 |
| 2011/0078745 A1 | 3/2011 | Macrae et al. .................. 725/60 |

FOREIGN PATENT DOCUMENTS

| | | |
|---|---|---|
| EP | 0912054 | 4/1999 |
| EP | 0989557 | 3/2000 |

| | | |
|---|---|---|
| EP | 1028551 | 8/2000 |
| EP | 107600 | 6/2001 |
| EP | 1117214 | 7/2001 |
| EP | 1175087 | 7/2001 |
| EP | 1145244 A1 | 10/2001 |
| EP | 1213919 | 6/2002 |
| EP | 1443766 | 8/2004 |
| EP | 1463324 | 9/2004 |
| EP | 1543680 B1 | 2/2010 |
| WO | WO 95/25402 | 9/1995 |
| WO | WO 96/19079 | 6/1996 |
| WO | WO 98/26584 | 6/1998 |
| WO | WO 98/37648 | 8/1998 |
| WO | WO 99/01984 | 1/1999 |
| WO | WO 99/35842 | 7/1999 |
| WO | WO 99/35844 | 7/1999 |
| WO | WO 99/65244 | 12/1999 |
| WO | WO 00/04707 | 1/2000 |
| WO | WO 00/04709 | 1/2000 |
| WO | WO 00/07372 | 2/2000 |
| WO | WO 00/45590 | 3/2000 |
| WO | WO 00/35201 | 6/2000 |
| WO | WO 01/01677 | 1/2001 |
| WO | WO 01/47234 | 6/2001 |
| WO | WO 01/56286 | 8/2001 |
| WO | WO 01/56297 | 8/2001 |
| WO | WO 01/74003 | 10/2001 |
| WO | WO 01/78382 | 10/2001 |
| WO | WO 01/86948 | 11/2001 |
| WO | WO 02/07378 | 1/2002 |
| WO | WO 02/11418 | 2/2002 |
| WO | WO 02/11446 | 2/2002 |
| WO | WO 02/17642 | 2/2002 |
| WO | WO 02/19623 | 3/2002 |
| WO | WO 02/47388 | 6/2002 |
| WO | WO 02/097997 | 12/2002 |
| WO | WO 03/032620 | 4/2003 |
| WO | WO 03/039154 | 5/2003 |
| WO | WO 2004/023717 | 3/2004 |
| WO | WO 2004/032514 | 4/2004 |
| WO | WO 2004/036808 | 4/2004 |
| WO | WO 2004/036892 | 4/2004 |
| WO | WO 2004/064296 | 7/2004 |
| WO | WO 2004/098190 | 11/2004 |
| WO | WO 2005/034515 | 4/2005 |
| WO | WO 2006/093741 | 9/2006 |

OTHER PUBLICATIONS

Alexis De Lattre er al., Videolan Streaming (online) Feb. 12, 2005, pp. 1-14.
Microsoft Computer Dictionary, 1999, Microsoft Press, 4th Edition, p. 123.
Alexis De Lattre et al., Videolan Streaming How to, 2005, pp. 1-61.
SCTE, "POD Copy Protection System," SCTE Society of Cable Telecommunications Engineers, [Online] Dec. 31, 2004, pp. 1-68, XP002414048, http://www.scte.org/documents/pdf/ANSISCTE412004.pdf.
Delta Beta In-Flight, www.deltabeta.com, retrieved from the internet on Jul. 17, 2008.
Written Opinion mailed Nov. 7, 2005 in PCT Application No. PCT/US2005/016290.
International Search Report dated Oct. 31, 2005 in PCT Application No. PCT/US2005/016290.
EP Communication dated Jul. 12, 2007 in Application No. 05 748 223.4-1241.
International Preliminary Examination Report dated Dec. 21, 2005 in PCT/US2003/32527.
Written Opinion mailed Dec. 10, 2004 in PCT/US2003/32527.
International Search Report dated Nov. 10, 2004 in PCT/US2003/32527.
International Preliminary Examination Report dated Jan. 18, 2006 in PCT/US2003/33686.
Written Opinion mailed Jun. 3, 2005 in PCT/US2003/33686.
International Search Report dated Feb. 6, 2004 in PCT/US2003/33686.
Canadian Office Action dated May 30, 2008 in Application No. 2,520,505.
Canadian Office Action dated Sep. 4, 2008 in Application No. 2,501,865.
International Search Report dated Sep. 29, 2006 in PCT/US2006/006199.
Written Opinion dated Oct. 12, 2006 in PCT/US2006/006199.
International Search Report dated Jan. 10, 2007 in PCT/US2006/033967.
Written Opinion mailed Mar. 2, 2007 in PCT/US2006/033967.
EP Communication dated Oct. 14, 2009 in Application No. 03 777 604.4-1241.
Supplementary European Search Report dated Jun. 18, 2009 in Application No. 03 777 604.4.
EP Communication dated Jun. 27, 2009 in Application No. 03 774 942.1.
Supplementary European Search Report dated Feb. 6, 2009 in Application No. 03 774 942.1-1241.
U.S. Official Action mailed Dec. 5, 2003 in U.S. Appl. No. 10/235,201.
U.S. Official Action mailed Feb. 13, 2004 in U.S. Appl. No. 10/342,670.
U.S. Official Action mailed May 7, 2004 in U.S. Appl. No. 10/235,201.
U.S. Official Action mailed Jul. 24, 2004 in U.S. Appl. No. 10/342,670.
U.S. Official Action mailed Sep. 10, 2004 in U.S. Appl. No. 10/437,556.
U.S. Official Action mailed Mar. 21, 2005 in U.S. Appl. No. 10/212,017.
U.S. Official Action mailed Mar. 23, 2005 in U.S. Appl. No. 10/342,670.
U.S. Official Action mailed Jun. 15, 2005 in U.S. Appl. No. 10/437,556.
U.S. Official Action mailed Jul. 27, 2005 in U.S. Appl. No. 10/235,201.
U.S. Official Action mailed Aug. 11, 2005 in U.S. Appl. No. 10/342,670.
U.S. Official Action mailed Oct. 19, 2005 in U.S. Appl. No. 10/212,017.
U.S. Official Action mailed Jan. 11, 2006 in U.S. Appl. No. 10/235,201.
U.S. Official Action mailed Jan. 30, 2006 in U.S. Appl. No. 10/437,556.
U.S. Official Action mailed Feb. 8, 2006 in U.S. Appl. No. 10/342,670.
U.S. Official Action mailed Apr. 19, 2006 in U.S. Appl. No. 10/212,017.
U.S. Official Action mailed Jun. 28, 2006 in U.S. Appl. No. 10/342,670.
U.S. Official Action mailed Jun. 30, 2006 in U.S. Appl. No. 10/437,556.
U.S. Official Action mailed Jul. 31, 2006 in U.S. Appl. No. 10/235,201.
U.S. Official Action mailed Oct. 31, 2006 in U.S. Appl. No. 10/342,670.
U.S. Official Action mailed Nov. 17, 2006 in U.S. Appl. No. 10/235,201.
U.S. Official Action mailed Nov. 20, 2006 in U.S. Appl. No. 10/437,556.
U.S. Official Action mailed May 3, 2007 in U.S. Appl. No. 10/437,556.
U.S. Official Action mailed May 4, 2007 in U.S. Appl. No. 10/263,160.
U.S. Official Action mailed May 4, 2007 in U.S. Appl. No. 10/924,077.
U.S. Official Action mailed May 7, 2007 in U.S. Appl. No. 10/342,670.
U.S. Official Action mailed May 8, 2007, in U.S. Appl. No. 10/263,449.

U.S. Official Action mailed Jul. 10, 2007 in U.S. Appl. No. 10/263,270.
U.S. Official Action mailed Jul. 18, 2007 in U.S. Appl. No. 11/162,232.
U.S. Official Action mailed Sep. 4, 2007 in U.S. Appl. No. 10/712,289.
U.S. Official Action mailed Sep. 10, 2007 in U.S. Appl. No. 10/842,823.
U.S. Official Action mailed Nov. 15, 2007 in U.S. Appl. No. 10/924,077.
U.S. Official Action mailed Nov. 16, 2007 in U.S. Appl. No. 10/263,160.
U.S. Official Action mailed Nov. 30, 2007 in U.S. Appl. No. 10/263,449.
U.S. Official Action mailed Jan. 4, 2008 in U.S. Appl. No. 10/342,670.
U.S. Official Action mailed Jan. 14, 2008 in U.S. Appl. No. 10/263,270.
U.S. Official Action mailed Jan. 29, 2008 in U.S. Appl. No. 11/162,232.
U.S. Official Action mailed Feb. 8, 2008 in U.S. Appl. No. 10/403,485.
U.S. Official Action mailed Mar. 18, 2008 in U.S. Appl. No. 10/924,077.
U.S. Official Action mailed Mar. 19, 2008 in U.S. Appl. No. 10/712,289.
U.S. Official Action mailed Apr. 4, 2008 in U.S. Appl. No. 10/842,823.
U.S. Official Action mailed May 13, 2008 in U.S. Appl. No. 10/263,160.
U.S. Official Action mailed Jun. 12, 2008 in U.S. Appl. No. 10/263,449.
U.S. Official Action mailed Jul. 8, 2008 in U.S. Appl. No. 11/069,439.
U.S. Official Action mailed Jul. 25, 2008 in U.S. Appl. No. 10/342,670.
U.S. Official Action mailed Sep. 5, 2008 in U.S. Appl. No. 11/162,232.
U.S. Official Action mailed Sep. 5, 2008 in U.S. Appl. No. 10/263,270.
U.S. Official Action mailed Sep. 17, 2008 in U.S. Appl. No. 10/403,485.
U.S. Official Action mailed Sep. 19, 2008 in U.S. Appl. No. 10/263,160.
U.S. Official Action mailed Sep. 26, 2008 in U.S. Appl. No. 10/212,017.
U.S. Official Action mailed Oct. 21, 2008 in U.S. Appl. No. 10/842,823.
U.S. Official Action mailed Oct. 22, 2008 in U.S. Appl. No. 10/924,077.
U.S. Official Action mailed Oct. 29, 2008 in U.S. Appl. No. 10/712,289.
U.S. Official Action mailed Nov. 26, 2008 in U.S. Appl. No. 11/069,439.
U.S. Official Action mailed Jan. 28, 2009 in U.S. Appl. No. 10/342,670.
U.S. Official Action mailed Feb. 6, 2009 in U.S. Appl. No. 10/263,270.
U.S. Official Action mailed Feb. 14, 2009 in U.S. Appl. No. 10/263,449.
U.S. Official Action mailed Mar. 13, 2009 in U.S. Appl. No. 11/069,439.
U.S. Official Action mailed Mar. 18, 2009 in U.S. Appl. No. 10/403,485.
U.S. Official Action mailed Mar. 20, 2009 in U.S. Appl. No. 11/162,232.
U.S. Official Action mailed Apr. 3, 2009 in U.S. Appl. No. 10/263,160.
U.S. Official Action mailed Apr. 15, 2009 in U.S. Appl. No. 10/712,289.
U.S. Official Action mailed Jul. 29, 2009 in U.S. Appl. No. 10/924,077.
U.S. Official Action mailed Aug. 28, 2009 in U.S. Appl. No. 10/263,449.
U.S. Official Action mailed Sep. 1, 2009 in U.S. Appl. No. 10/263,270.
U.S. Official Action mailed Sep. 3, 2009 in U.S. Appl. No. 10/403,485.
U.S. Official Action mailed Sep. 11, 2009 in U.S. Appl. No. 10/263,160.
U.S. Official Action mailed Sep. 29, 2009 in U.S. Appl. No. 10/712,289.
U.S. Official Action mailed Sep. 30, 2009 in U.S. Appl. No. 11/069,439.
U.S. Official Action mailed Oct. 16, 2009 in U.S. Appl. No. 12/056,812.
Kerr, G., "A Review of Fully Interactive Video on Demand" Signal Processing. Image Communication, Elsevier Science Publishers, Amsterdam, NL, vol. 8, No. 3, Apr. 1996, pp. 173-190, XP004047063 ISSN: 0923-5965.
Alexis De Lattre et al., Videolan Streaming (online) Feb. 12, 2005, pp. 1-14.
Alexis De Lattre et al., Videolan Streaming Howto, 2005, pp. 1-61.
Microsoft Computer Dictionary, 1999, Microsoft Press, 4$^{th}$ Edition, p. 123.
U.S. Appl. No. 09/332,244; Ellis et al., filed Jun. 11, 1999 is included by reference by 2005/0028208 (Not published).
U.S. Appl. No. 10/008,581, filed Nov. 13, 2001, Entitled "Networked Subscriber Television Distribution," Inventors: Russ, et al.
U.S. Appl. No. 10/104,921, filed Mar. 22, 2002, Entitled "Exporting Data from a Digital Home Communication Terminal to a Client Device," Inventors: Gaul, et al.
U.S. Appl. No. 10/212,017, filed Aug. 2, 2002, Entitled "Locally-Updated Interactive Program Guide," Inventors: Russ et al.
U.S. Appl. No. 10/263,270, filed Oct. 2, 2002, Entitled "Video Transmission Systems and Methods for a Home Network," Inventors: Robertson et al.
U.S. Appl. No. 10/342,670, filed Jan. 15, 2003, Entitled "Networked Multimedia System," Inventors: Robertson et al.
U.S. Appl. No. 10/403,485, filed Mar. 31, 2003, Entitled "Networked Multimedia System having a Multi-Room Interactive Network Guide," Inventors: Russ et al.
U.S. Appl. No. 10/998,879, filed Nov. 29, 2004, Entitled "Consolidating Video on Demand (VOD) Services with Multi-Room Personal Video Recording (MR-PVR) Services," Inventors: Schutte, et al.
U.S. Appl. No. 10/294,947, filed Nov. 14, 2002, Entitled "Networked Subscriber Television Distribution," Inventors: Russ, et al.
U.S. Appl. No. 10/676,968, filed Oct. 1, 2003, Entitled "Proximity Detection using Wireless Connectivity in a Communications System," Inventors: Claussen, et al.
U.S. Appl. No. 11/069,440, filed Mar. 1, 2005, Entitled "Interactive Network Guide with Parental Monitoring," Inventors: Ostrowska, et al.
U.S. Appl. No. 10/924,077, filed Aug. 23, 2004, Entitled "Full Duplex Wideband Communications System for a Local Coaxial Network," Inventors: Robertson, et al.
U.S. Appl. No. 10/842,823, filed May 11, 2004, Entitled "Networked Multimedia Overlay System," Inventor: P. J. Claussen.
U.S. Appl. No. 11/564,347, filed Nov. 29, 2006, Entitled "Viewer Data Collection in a Multi-Room Network," Inventor: Russ, Samuel H.
U.S. Appl. No. 11/162,232, filed Sep. 2, 2005, Entitled "Multiroom Point of Deployment Module," Inventors: Wall, et al.
U.S. Appl. No. 10/923,948; filed Aug. 23, 2004, Entitled "Optimization of a Full Duplex Wideband Communications Systems," Inventors: Robertson, et al.
U.S. Appl. No. 11/069,439, filed Mar. 1, 2005, Entitled "Parental Control for a Networked Multi-Room System," Inventors: Ostrowska, et al.
SCTE, "Client-Based Digital Program Insertion Business Goal," DVS/632r1, Mar. 27, 2004.
SCTE, "Working Group Work Plan 5," DVS 177, Sep. 1, 1998.
SCTE, "Proposed Amendment of SCTE 30 2001 Digital Program Insertion Splicing API," DVS 638r3, Feb. 4, 2005.

Broadcast Engineering, "Digital Program Insertion," Business Models, Jul. 1, 2002.
nCUBE, "Digital Program Insertion," nCUBE, May 2001.
Matsushita Electric Industrial Co., Ltd. "DVB Call for Proposals for Content Protection & Copy Management Technologies," NetDRM Technology, XP002349078, Oct. 19, 2001, pp. 1-44.
International Search Report dated Mar. 1, 2005 in OCT/US2004/032389.
Canadian Office Action dated Jul. 24, 2009 in Application No. 2,566,742.
EP Summons to attend oral proceedings dated Jan. 27, 2010 in Application No. 03 774 942.1-1241.
U.S. Official Action mailed Mar. 13, 2006 in U.S. Appl. No. 10/008,581.
U.S. Official Action mailed Dec. 18, 2006 in U.S. Appl. No. 10/008,581.
U.S. Official Action mailed Mar. 21, 2007 in U.S. Appl. No. 10/294,947.
U.S. Official Action mailed Apr. 25, 2007 in U.S. Appl. No. 10/008,581.
U.S. Official Action mailed Jul. 10, 2007 in U.S. Appl. No. 10/104,921.
U.S. Official Action mailed Oct. 4, 2007 in U.S. Appl. No. 10/008,581.
U.S. Official Action mailed Oct. 5, 2007 in U.S. Appl. No. 10/294,947.
U.S. Official Action mailed Nov. 29, 2007 in U.S. Appl. No. 10/104,921.
U.S. Official Action mailed Jan. 10, 2008 in U.S. Appl. No. 10/923,948.
U.S. Official Action mailed Mar. 18, 2008 in U.S. Appl. No. 10/008,581.
U.S. Official Action mailed Apr. 24, 2008 in U.S. Appl. No. 10/104,921.
U.S. Official Action mailed May 1, 2008 in U.S. Appl. No. 10/923,948.
U.S. Official Action mailed May 15, 2008 in U.S. Appl. No. 10/294,947.
U.S. Official Action mailed Jun. 2, 2008 in U.S. Appl. No. 10/998,879.
U.S. Official Action mailed Jun. 30, 2008 in U.S. Appl. No. 10/907,540.
U.S. Official Action mailed Jul. 9, 2008 in U.S. Appl. No. 11/069,440.
U.S. Official Action mailed Sep. 18, 2008 in U.S. Appl. No. 10/008,581.
U.S. Official Action mailed Nov. 6, 2008 in U.S. Appl. No. 10/104,921.
U.S. Official Action mailed Nov. 28, 2008 in U.S. Appl. No. 10/998,879.
U.S. Official Action mailed Dec. 12, 2008 in U.S. Appl. No. 10/294,947.
U.S. Official Action mailed Dec. 23, 2008 in U.S. Appl. No. 11/163,107.
U.S. Official Action mailed Jan. 7, 2009 in U.S. Appl. No. 10/904,540.
U.S. Official Action mailed Jan. 23, 2009 in U.S. Appl. No. 11/169,440.
U.S. Official Action mailed Feb. 9, 2009 in U.S. Appl. No. 10/008,581.
U.S. Official Action mailed Mar. 2, 2009 in U.S. Appl. No. 11/564,347.
U.S. Official Action mailed May 21, 2009 in U.S. Appl. No. 10/294,947.
U.S. Official Action mailed May 21, 2009 in U.S. Appl. No. 10/998,879.
U.S. Official Action mailed Jun. 10, 2009 in U.S. Appl. No. 10/907,540.
U.S. Official Action mailed Jun. 11, 2009 in U.S. Appl. No. 10/104,921.
U.S. Official Action mailed Aug. 19, 2009 in U.S. Appl. No. 11/069,440.
U.S. Official Action mailed Sep. 4, 2009 in U.S. Appl. No. 11/564,347.
U.S. Official Action mailed Nov. 16, 2009 in U.S. Appl. No. 10/907,540.
U.S. Official Action mailed Dec. 16, 2009 in U.S. Appl. No. 10/294,947.
U.S. Official Action mailed Dec. 16, 2009 in U.S. Appl. No. 11/564,347.
U.S. Official Action mailed Jan. 12, 2010 in U.S. Appl. No. 10/104,921.
U.S Official Action mailed Jan. 21, 2010 in U.S. Appl. No. 11/069,439.
U.S. Official Action mailed Jan. 25, 2010 in U.S. Appl. No. 11/162,232.
U.S. Official Action mailed Jan. 28, 2010 in U.S. Appl. No. 10/924,077.
U.S. Appl. No. 09/332,244 filed Jun. 11, 1999 entitled "Client-Server Based Interactive Television Program Guide System With Remote Server Recording", Inventors: Michael Ellis, William Thomas, Thomas Lemmons.
U.S. Appl. No. 09/354,344 filed Jul. 16, 1999 entitled "Interactive Television Program Guide With Remote Access", Inventors: Michael Ellis, William Thomas, Joel Hassell, Thomas Lemmons, David Berezowski, Robert Knee, Robert McCoy.
U.S. Appl. No. 09/356,161 filed Jul. 16, 1999 entitled "Interactive Television Program Guide System Having Multiple Devices Within a Household", Inventors: Michael Ellis, William Thomas, Thomas Lemmons.
Proakis, "Section 4.3.3, Non-linear modulation methods with memory," Digital Communications, Jan. 1, 1995, McGraw Hill, Singapore, XP002613053, ISBN: 0-07-113814-5, pp. 190-199.
Canadian Office Action dated Sep. 1, 2010 in Application No. 2,494,494.
Canadian Office Action dated Oct. 14, 2010 in Application No. 2,501,112.
EP Summons to attend oral proceedings dated Dec. 13, 2010 in Application No. 06 815 494.7.
Supplementary European Search Report dated Dec. 20, 2010 in Application No. 03 799 378.9.
U.S. Official Action mailed Sep. 14, 2010 in U.S. Appl. No. 11/942,077.
U.S. Official Action mailed Oct. 15, 2010 in U.S. Appl. No. 10/907,540.
U.S. Official Action mailed Nov. 10, 2010 in U.S. Appl. No. 10/263,270.
U.S. Official Action mailed Nov. 23, 2010 in U.S. Appl. No. 10/263,449.
U.S. Notice of Allowance mailed Nov. 26, 2010 in U.S. Appl. No. 11/162,232.
U.S. Appl. No. 09/262,870 filed Mar. 4, 1999 entitled "Program Guide System with Video-On-Demand Browsing," Inventors: Michael D. Ellis.
Supplementary European Search Report dated Jul. 14, 2005 in Application No. 03 74 5552.
International Search Report dated Jun. 14, 2006 in PCT/US2006/006201.
International Search Report dated Sep. 28, 2006 in PCT/US2006/010764.
International Search Report dated Jan. 25, 2007 in PCT/US2006/037542.
Written Opinion dated Jan. 25, 2007 in PCT/US2006/037542.
International Search Report dated Oct. 29, 2007 in PCT/US2006/060967.
Written Opinion dated Oct. 29, 2007 in PCT/US2006/060967.
EP Communication dated Mar. 10, 2008 in Application No. 05 852 294.7.
International Search Report dated Jun. 9, 2008 in PCT/US2007/085694.
EP Communication dated Jul. 18, 2008 in Application No. 05 852 294.7.
EP Communication dated Feb. 27, 2009 in Application No. 06 739 511.1.

EP Communication dated Apr. 6, 2009 in Application No. 05 852 294.7-1522.
Canadian Office Action dated Apr. 15, 2009 in Application No. 2,478,838.
EP Communication dated Aug. 24, 2009 in Application No. 06 735 737.6-1241.
Canadian Office Action dated Oct. 5, 2009 in Application No. 2,588,912.
EP Communication dated Oct. 29, 2009 in Application No. 06 815 494.7.
Canadian Office Action dated Nov. 2, 2009 in Application No. 2,599,947.
Canadian Office Action dated Nov. 2, 2009 in Application No. 2,603,257.
Canadian Office Action dated Dec. 15, 2009 in Application No. 2,520,505.
Canadian Office Action dated Jan. 13, 2010 in Application No. 2,541,161.
Canadian Office Action dated Mar. 4, 2010 in Application No. 2,599,941.
EP Communication dated Mar. 18, 2010 in Application No. 06 815 494.7.
EP Communication dated Apr. 12, 2010 in Application No. 03 777 604.4-1241.
Canadian Office Action dated Jul. 2, 2010 in Application No. 2,630,123.
U.S. Official Action mailed May 31, 2005 in U.S. Appl. No. 09/332,244.
U.S. Official Action mailed Sep. 20, 2006 in U.S. Appl. No. 10/036,329.
U.S. Official Action mailed Dec. 19, 2006 in U.S. Appl. No. 09/332,244.
U.S. Official Action mailed May 29, 2007 in U.S. Appl. No. 10/036,329.
U.S. Official Action mailed Jun. 27, 2007 in U.S. Appl. No. 09/332,244.
U.S. Official Action mailed Nov. 2, 2007 in U.S. Appl. No. 10/676,968.
U.S. Official Action mailed Jul. 23, 2008 in U.S. Appl. No. 10/676,968.
U.S. Official Action mailed Dec. 26, 2008 in U.S. Appl. No. 11/164,337.
U.S. Official Action mailed Apr. 6, 2009 in U.S. Appl. No. 11/945,284.
U.S. Official Action mailed Jul. 21, 2009 in U.S. Appl. No. 11/164,337.
U.S. Official Action mailed Oct. 6, 2009 in U.S. Appl. No. 12/352,140.
U.S. Official Action mailed Oct. 29, 2009 in U.S. Appl. No. 11/945,284.
U.S. Official Action mailed Nov. 30, 2009 in U.S. Appl. No. 10/998,879.
U.S. Official Action mailed Dec. 30, 2009 in U.S. Appl. No. 11/164,337.
U.S. Official Action mailed Feb. 17, 2010 in U.S. Appl. No. 10/263,449.
U.S. Official Action mailed Feb. 24, 2010 in U.S. Appl. No. 10/403,485.
U.S. Official Action mailed Mar. 1, 2010 in U.S. Appl. No. 10/712,289.
U.S. Official Action mailed Mar. 3, 2010 in U.S. Appl. No. 10/263,160.
U.S. Official Action mailed Apr. 7, 2010 in U.S. Appl. No. 12/056,812.
U.S. Official Action mailed May 5, 2010 in U.S. Appl. No. 10/998,879.
U.S. Official Action mailed May 18, 2010 in U.S. Appl. No. 10/907,540.
U.S. Official Action mailed May 25, 2010 in U.S. Appl. No. 11/069,439.
U.S. Official Action mailed May 26, 2010 in U.S. Appl. No. 10/263,270.
U.S. Official Action mailed Jun. 8, 2010 in U.S. Appl. No. 11/564,347.
U.S. Official Action mailed Jul. 16, 2010 in U.S. Appl. No. 11/164,337.
U.S. Official Action mailed Jul. 27, 2010 in U.S. Appl. No. 10/924,077.
U.S. Official Action mailed Aug. 20, 2010 in U.S. Appl. No. 11/945,284.
U.S. Official Action mailed Aug. 27, 2010 in U.S. Appl. No. 10/403,485.
U.S. Official Action mailed Aug. 31, 2010 in U.S. Appl. No. 12/416,392.
U.S. Official Action mailed Sep. 9, 2010 in U.S. Appl. No. 10/998,879.
U.S. Appl. No. 09/568,932, filed May 11, 2000 entitled "Electronic Content Guide Renders Content Resources Transparent", Inventors: Eugene Shteyn et al.
EP Summons to attend oral proceedings dated Dec. 2, 2010 in Application No. 03 777 604.4.
Canadian Office Action dated Dec. 3, 2010 in Application No. 2,478,838.
Canadian Office Action dated Dec. 17, 2010 in Application No. 2,497,013.
Canadian Office Action dated Jan. 20, 2011 in Application No. 2,599,941.
Canadian Office Action dated Jan. 27, 2011 in Application No. 2,621,382.
Canadian Office Action dated Feb. 10, 2011 in Application 2,599,947.
EP Communication dated Mar. 23, 2011 in Application No. 03 777 604.4.
EP Communication dated Mar. 31, 2011 in Application No. 03 799 378.9.
Canadian Office Action dated Apr. 13, 2011 in Application No. 2,630,123.
Canadian Office Action dated Apr. 20, 2011 in Application No. 2,588,912.
U.S. Official Action mailed Feb. 2, 2011 in U.S. Appl. No. 12/178,731.
U.S. Official Action mailed Feb. 15, 2011 in U.S. Appl. No. 10/403,485.
U.S. Official Action mailed Mar. 18, 2011 in U.S. Appl. No. 11/943,077.
U.S. Office Action mailed Mar. 25, 2011 in U.S. Appl. No. 10/907,540.
U.S. Official Action mailed Apr. 1, 2011 in U.S. Appl. No. 12/416,392.
U.S. Official Action mailed Apr. 27, 2011 in U.S. Appl. No. 11/945,284.
Canadian Office Action dated Apr. 20, 2011 in Application No. 2,566,742.
Canadian Office Action dated Aug. 30, 2011 in Application No. 2,603,257.
Canadian Office Action dated Oct. 6, 2011 in Application No. 2,624,876.
U.S. Office Action mailed Sep. 13, 2011 in U.S. Appl. No. 10/907,540.
U.S. Official Action mailed Jul. 6, 2011 in U.S. Appl. No. 12/178,731.
U.S. Official Action mailed Nov. 23, 2011 in U.S. Appl. No. 12/416,392.
U.S. Official Action mailed Jan. 5, 2012 in U.S. Appl. No. 12/056,812.
Canadian Office Action dated Nov. 23, 2011 in Application No. 2,520,505.
Canadian Office Action dated Nov. 24, 2011 in Application No. 2,254,161.
U.S. Official Action mailed Feb. 21, 2012 in U.S. Appl. No. 12/273,886.
EP Communication dated Mar. 16, 2012 in Application No. 06 739 511.1.

U.S. Official Action mailed May 9, 2012 in U.S. Appl. No. 12/416,392.
Canadian Office Action dated Apr. 10, 2012 in Application 2,599,941.
Canadian Office Action dated Apr. 13, 2012 in Application 2,621,382.
Canadian Office Action dated Apr. 13, 2012 in Application 2,629,313.
Canadian Office Action dated Apr. 17, 2012 in Application 2,599,947.

* cited by examiner

FULL DUPLEX WIDEBAND COMMUNICATIONS SYSTEM FOR A LOCAL COAXIAL NETWORK

RELATED APPLICATIONS

The present U.S. application is a divisional of copending U.S. patent application Ser. No. 10/924,077, filed on Aug. 23, 2004, entitled "FULL DUPLEX WIDEBAND COMMUNICATIONS SYSTEM FOR A LOCAL COAXIAL NETWORK."

The patent application is a continuation-in-part of copending U.S. patent application Ser. No. 10/342,670 filed Jan. 15, 2003, entitled "NETWORKED MULTIMEDIA SYSTEM."

FIELD OF THE INVENTION

This invention relates in general to broadband communications systems, and more particularly, to the field of a full duplex wideband communications system operating within a local coaxial network.

DESCRIPTION OF THE RELATED ART

Subscriber premises receiving cable television or satellite service typically have a coaxial network for providing received signals to various rooms in the premises. The coaxial network typically connects set-top terminals (STT) for decoding the signals (e.g., cable or satellite television (CATV) signals) to a communications system. It will be appreciated that other equipment, such as cable modems and video recorders, to name a couple, can also be connected to the coaxial network. The transmitted signals may be, therefore, video/audio signal, telephony signals, or data signals.

Traditionally, an individual STT could not communicate with the other networked STTs; they were receiving devices that may have had the capability to transmit data to a headend facility in the system. As technology progressed, a server STT could communicate with a plurality of remote STTs in a network. This communication is desirable in that the server STT could share files or programs with the remote STTs upon command from the remote STT. By way of example, the server STT may contain storage media, such as hard disk drives, to store video programs. Accordingly, the networked remote STTs may want to view those stored programs. In this manner, upon request, the server STT can transmit a program to the requesting remote STT for viewing at that STT. Further information regarding a networked multimedia system that includes a server and remote STTs can be found in copending U.S. patent application Ser. No. 10/342,670 filed Jan. 15, 2003, the disclosure and teachings of which are hereby incorporated by reference.

A need exists, however, for systems and methods that improve upon communications among networked equipment in a subscriber premises.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, data, or Internet Protocol (IP) signals, to name but a few. Devices included in the broadband communications system for receiving the transmitted broadband signals may include a set-top terminal (STT), a television, a consumer electronics device such as a DVD player/recorder, a computer, a personal digital assistant (PDA), or other type of electronics device. Furthermore, in accordance with the present invention all of these receiving devices may include a modem or be connected to a stand-alone modem for receiving high speed data. All examples given herein, therefore, are intended to be non-limiting and are provided in order to help clarify the description of the invention.

The present invention is directed towards a full duplex wideband communications device and system that are suitable for use in a coaxial network. The coaxial network is typically confined to a subscriber premises. It will be appreciated, however, that the network can also be used in a multi-unit dwelling, business, school, hotel, or hospital, among others. Advantageously, the present invention allows for full duplex wideband communications among STTs or modems that are connected in the coaxial network. The communications between any pair of STTs (e.g., a server STT and a remote STT or two remote STTs) are at data rates suitable for high definition video transmissions. The present invention also allows multiple STTs to share the network without interference with each other. Additionally, a STT, for example, the server STT, is capable of providing different content to different remote STTs concurrently. Furthermore, the communication between STTs and the reception of conventional CATV signals occur simultaneously without interference to the received CATV signals. As mentioned, the modem can be a standalone device that is connected to an STT and still utilize the full duplex wideband communications in accordance with the present invention.

Figure 1:
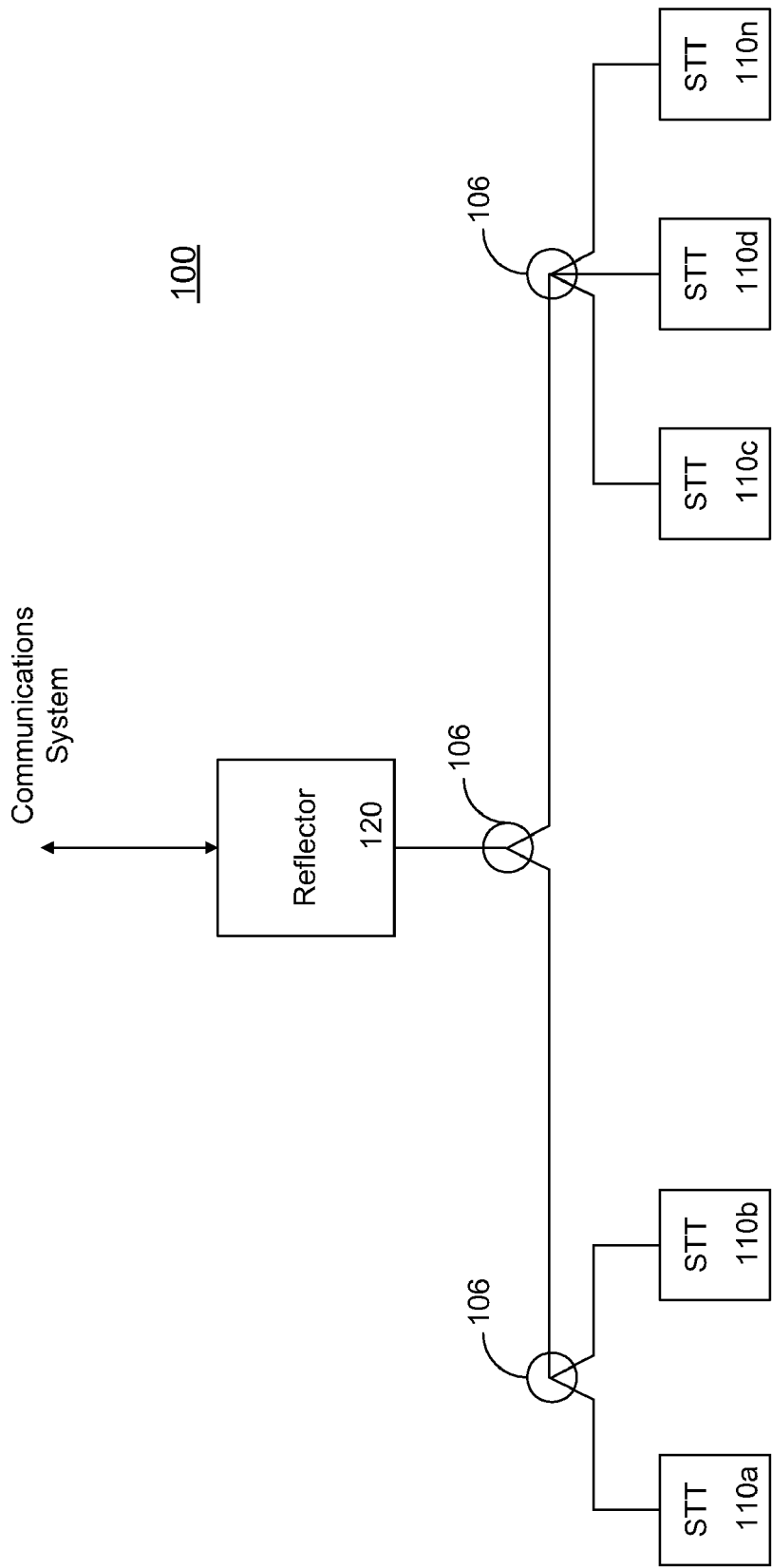
FIG. 1 illustrates a block diagram of a coaxial network 100 that includes a plurality of STTs for receiving and decoding CATV signals.

FIG. 1 illustrates a block diagram of a coaxial network 100 that includes coaxial cables 105 and power splitters 106. The coaxial network 100 is designed to connect set-top terminals (STTs) 110a-n within the premises to the CATV communications system. In the coaxial network, the STTs 110a-n (or other devices connected to the network 100) should preferably be able to communicate with each other. However, there is high loss between the STTs 110a-n due to port-port isolation of the splitters 106. To reduce the loss between the STTs 110a-n, a reflector 120 is inserted between the coaxial network 100 and the CATV communications system. The reflector 120 contains one or more band-reject filters that are centered on frequencies used to communicate between the STTs 110a-n. The filters reflect signals at these frequencies with low loss, so that the loss between STTs is minimized. Additionally, the band reject filters prevent the in-home signals from entering the CATV communications system. It will be appreciated that the block diagram of FIG. 1 can be reconfigured into several different configurations. For example, the splitters 106 can be incorporated into the reflector 120. Additionally, the reflector 120 shown operates using reflection of the signals, but other techniques could be used to reduce loss in the desired frequency bands. For example, it is possible to design a splitter that has reduced isolation in particular frequency bands, particularly in the modem's low band and high band. If this method were used, it would still be desirable to keep the coaxial network signals from leaking into the communications system. To reduce this leakage, an amplifier having sufficient reverse isolation could be placed in line with the cable from the communications system to the coaxial network. Further information regarding the reflector 120 can be found in copending U.S. patent application Ser. No. 10/342,670 filed Jan. 15, 2003, the disclosure and teachings of which are hereby incorporated by reference.

Figure 2:
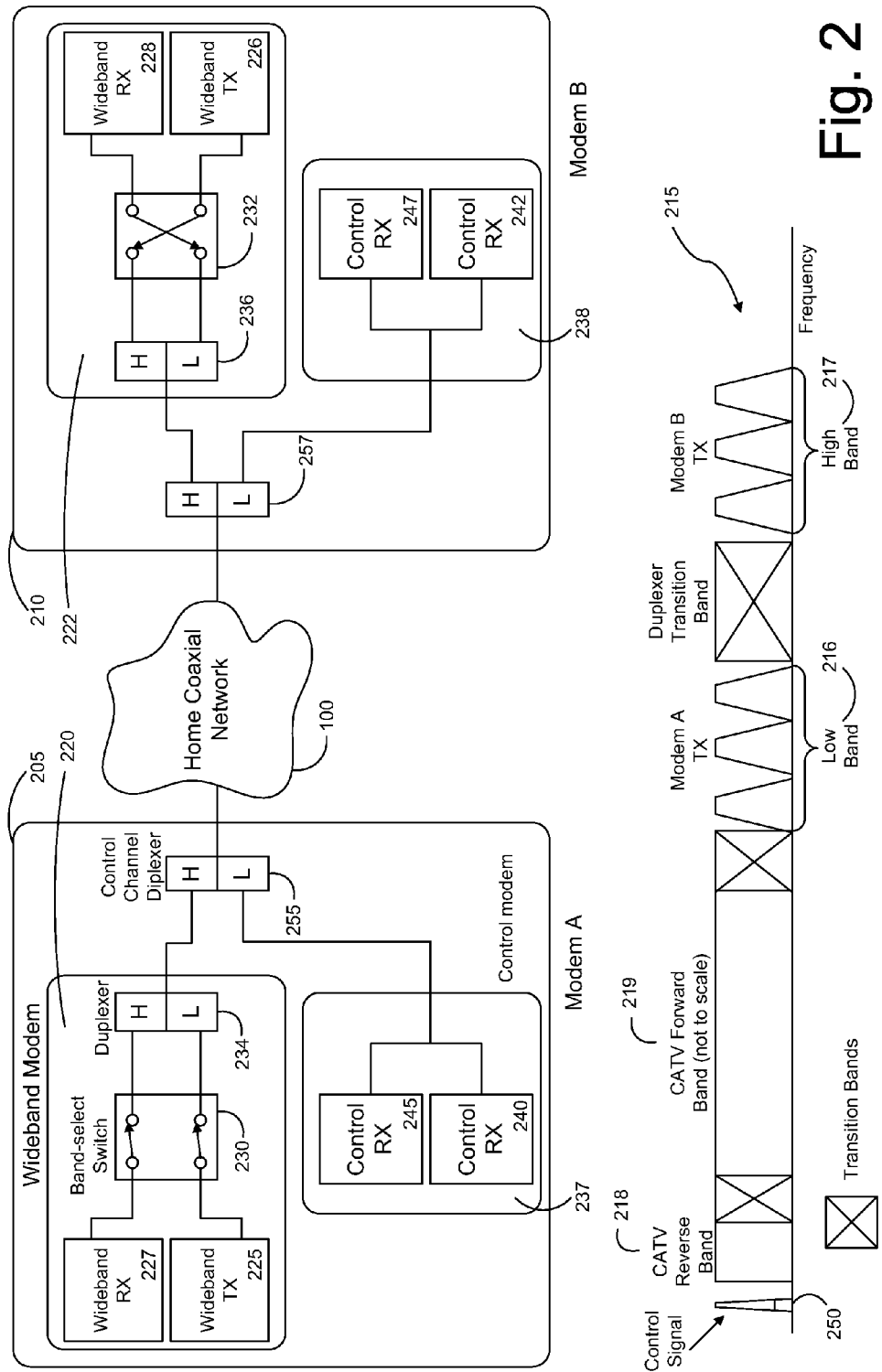
FIG. 2 illustrates a block diagram of two networked modems and a frequency range plan that are suitable for employing the full duplex wideband communications in accordance with the present invention.

FIG. 2 illustrates a block diagram of two networked modems 205, 210 and a frequency range plan 215 that are suitable for employing the full duplex wideband communications in accordance with the present invention. Two modems 205, 210 are shown connected to the coaxial network 100. Specifically, the modems 205, 210 communicate with each other, or other modems. In accordance with the present invention, the modems 205, 210 communicate in full duplex wideband mode. That is to say that modem A 205 may transmit signals in a low band 216 and modem B 210 may transmit in a high band 217 with each other. As will be discussed further below, the channel allocated to the modems 205, 210 may change. Only two modems 205, 210 are shown in this illustration; however, since several modems may be operating simultaneously in the coaxial network 100, there are preferably multiple wideband channels in bands 216 and 217 in the frequency range 215 to avoid conflict. Other signals transmitted in the frequency range 215 comprise a reverse band 218 from, for example, 5 MHz to 40 MHz that the STTs 110 use to communicate back to the headend facility in the system. Additionally, a forward band 219, ranging from 50 MHz to 870 MHz, carries several channels of downstream programs that are broadcasted from the headend facility to the STTs 110 throughout the system.

The modems 205, 210 each include a wideband modem 220, 222 comprising transmitters 225, 226 and receivers 227, 228 for high data rate communications, such as transmitting and receiving stored video presentations, within the coaxial network 100. The preferred modulation method for the wideband data communications is QAM (quadrature amplitude modulation), and typically the frequencies are above the forward band 219. The wideband modems 220, 222 also include a band-select switch 230, 232 and a duplexer 234, 236 for routing the wideband signals.

A medium access method is similar to frequency division multiple access with frequency division duplex (FDMA/FDD). FDMA/FDD is appropriate for systems having a base station and multiple users, such as cellular telephone. In the FDMA/FDD system, the base station transmits in a downlink band, and the users transmit in an uplink band. The receiver is isolated from the transmitter by a duplexer. In accordance with the present invention, however, coupled modems 205, 210, or STTs that include modems 205, 210, communicate directly with each other (e.g., from STT 110a to STT n) rather than the conventional method. In other words, there is no base station in the coaxial network 100. To allow any two wideband modems 205, 210 to communicate in this manner, however, the FDD scheme is no longer sufficient.

To allow the wideband modems 205, 210 to communicate in accordance with the present invention, the modems 205, 210 can transmit and receive in either of two bands (e.g., low band 216 and high band 217). The electronically-controlled band select switch 230, 232 allows reversing the connection of the transmitter 225, 226 and receiver 227, 228 to the duplexer 234, 236. As shown in FIG. 2, modem A 205 is set to transmit in the low band 216 and receive in the high band 217, and modem B 210 is set to transmit in the high band 217 and receive in the low band 216. Transmitting and receiving in a frequency included in either the high band or the low band can be optimized and is discussed further below. For either setting of the band select switch 230, 232, the duplexer 234, 236 attenuates the transmit signal so that the receiver sensitivity is not degraded by the transmitter (i.e., modem A's transmitter 225 does not affect modem A's receiver 227). Each band 216, 217 may contain multiple signals to allow multiple pairs of modems to communicate simultaneously. The transmitters 225, 226 and receivers 227, 228 need to be able to function over a frequency range that includes both the high and low bands. The switch 230, 232 should preferably be a monolithic double-pole double-throw type. The duplexer 234, 236 should preferably use dielectric resonator technology, while the control channel diplexer 255, 257 is preferably an LC filter.

The modems 205, 210 also include a control modem 237, 238 comprising transmitters 240, 242 and receivers 245, 247 used for control communications among the modems 205, 210 within the coaxial network 100. More specifically, the control transmitter 240, 242 provides control information, such as an optimized transmitting frequency of the wideband modem, or requests, such as a request for a stored video presentation, to at least one control receiver 245, 247. The control receiver 245, 247 then receives the information or request and acts accordingly.

In contrast to the full duplex wideband modems 220, 222, the control modems 237, 238 operate on a single frequency and in half duplex mode. Additionally, the single frequency is separate from bands 216, 217 used by the wideband modems 220, 222. The control frequency 250 used by the control modem 237, 238 is typically below the reverse band 218, for example, at 4.5 MHz. The control signals and the wideband data communications signals are routed to the coaxial network 100 using the control channel diplexer 255, 257.

The control modems 237, 238 send and receive data packets as burst packages using a modulation scheme such as FSK (frequency shift keying). Each packet includes an error-detection code and a destination address. The control modems 237, 238 use a random access protocol similar to ALOHA in a known manner. A protocol for control communications from, for example, modem A 237 to modem B 238 may be summarized as follows:

Modem A 237 sends a packet to modem B 238 and then waits for acknowledgement;

assuming modem B 238 receives the packet with no errors and the address is that of modem B 238, modem B 238 sends a short acknowledgement;

if the acknowledgement signal is received by modem A 237, then modem A 237 sends the next packet. If the acknowledgement signal is not received within a specified time, modem A 237 waits a random time and resends the initial packet.

Figure 3:
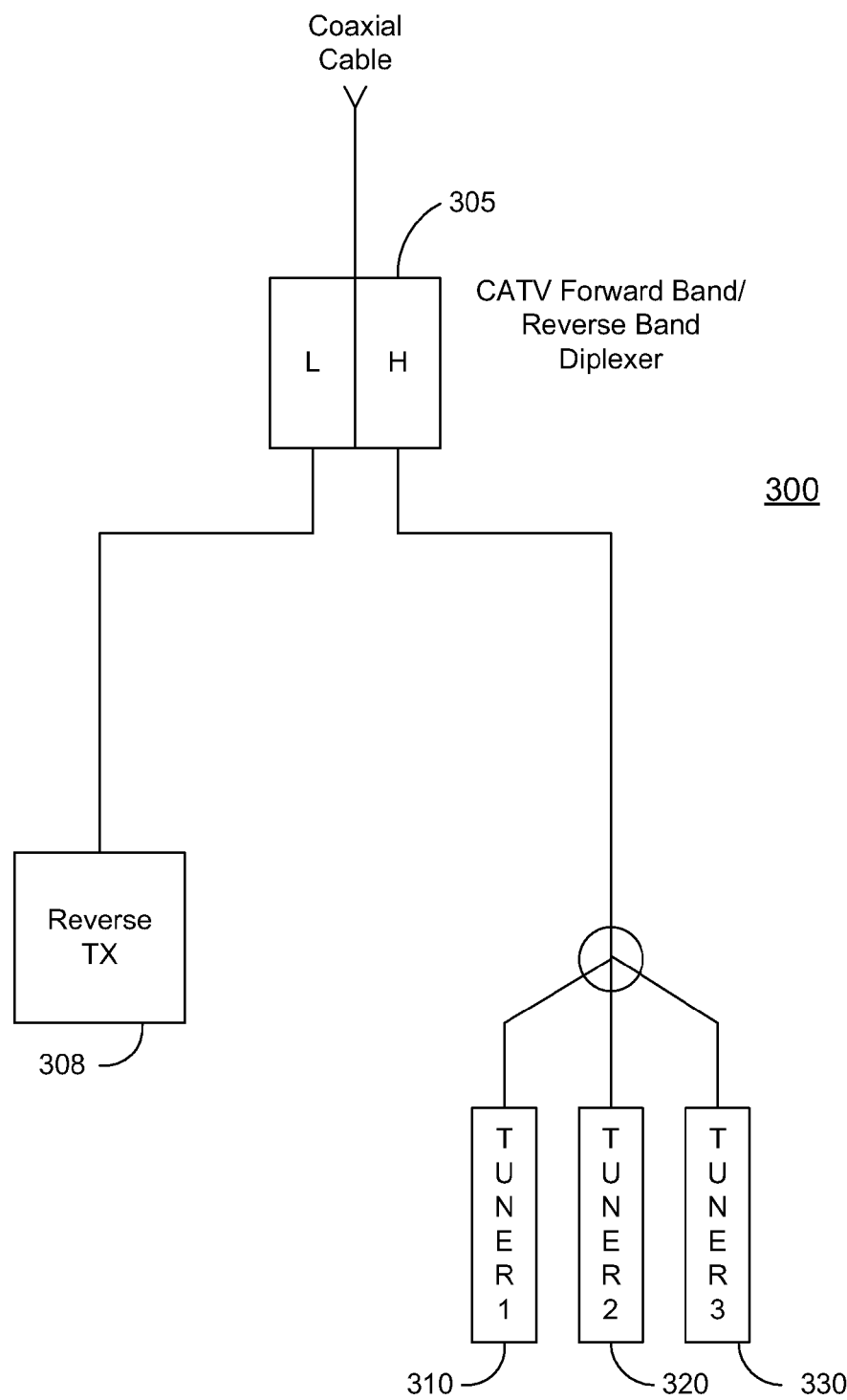
FIG. 3 illustrates a simplified block diagram of the RF portion of a set-top terminal.

FIG. 3 illustrates a simplified block diagram of a radio frequency (RF) portion of a set-top terminal (STT). STT 300 includes diplexer 305, which isolates tuners 310, 320, 330 from a reverse transmitter 308. The reverse transmitter 308 transmits signals to the headend facility in the communications system. Tuners 310, 320, 330 can be used to receive live television signals (CATV signals), record to a hard drive, or receive cable modem signals. The tuners 310, 320, 330 are capable of receiving QAM signals. Advantageously, a wideband modem 220, 222 that uses some of these existing STT functions can be added to the STT 300.

Figure 4:
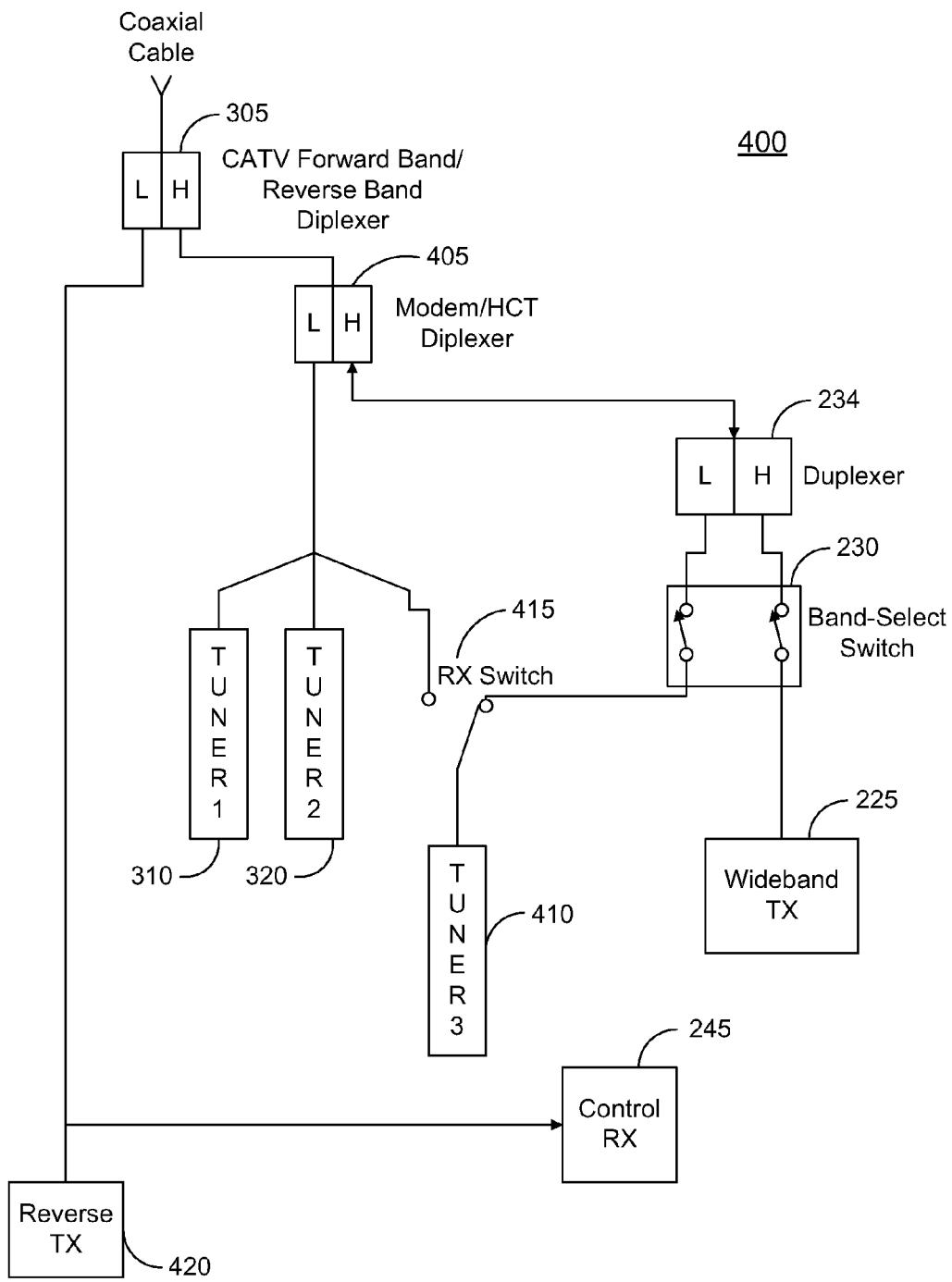
FIG. 4 illustrates a simplified STT including a wideband modem in accordance with the present invention.

FIG. 4 illustrates a simplified STT including a wideband modem in accordance with the present invention. CATV signals are received from the communications system at diplexer 305. Diplexer 405 provides the CATV signals and any modem RF signals to the intended destination depending upon the received signal frequency. In accordance with the present invention, tuner 410 can be configured to act as the wideband receiver 227 shown in FIG. 2, and switch 415 is added to select the appropriate signal path depending upon the type of received signals. Accordingly, switch 415 connects the tuner 410 to receive wideband communications signals from another modem 210. In the event that the STT 400 requires a third tuner to receive CATV signals, the switch 415 connects the tuner 410 to the communications system. The STT's reverse transmitter 420 may be shared between the CATV reverse band 218 and the control channel signals 250. The reverse transmitter 420 may be configured as an FSK transmitter.

Returning to FIG. 2, a communications protocol needs to be established between two modems. A simplified example of a protocol used by the initiating modem 205 and the receiving modem 210 follows assuming knowledge of unused frequencies and that it is arbitrarily chosen that modem A 205 transmits in the low band.

Modem A 205 sets the band switch to Tx/Rx=low/high;

modem A 205 chooses from the unused frequencies low and high band frequencies ($f_L$ and $f_H$);

modem A 205 uses the control transmitter 240 to send the chosen frequency information to modem B 210;

modem B 210 sends an acknowledgement using control transmitter 242 and, based on the frequency chosen by modem A 205, sets the band switch 232 to Tx/Rx=high/low and tunes the wideband receiver 228 to the frequency in the low band ($f_L$);

modem A 205 then tunes its wideband receiver 227 to the frequency in the high band ($f_H$) and begins transmitting data at $f_L$;

modem B 210 begins transmitting at $f_H$; and modem A 205 uses control transmitter 240 to send a message to any other modems on the network indicating that the two chosen frequencies ($f_L$ and $f_H$) are currently in use.

Another embodiment of a full duplex communications modem for the coaxial network 100 is a client modem. A client modem includes a wideband receiver and a control transmitter. The client modem does not include a wideband transmitter or control receiver. In this manner, the client modem uses the control transmitter to request a wideband transmission from a server wideband modem and then receives the wideband transmission using its wideband receiver. A typical application for the client modem is to request and receive video programs stored in an STT that is connected to or containing the wideband communications modem 205.

As previously discussed, the modem signals are reflected and contained within the coaxial network 100 by filters within the reflector 120 (FIG. 1). In this manner, the loss between modems is minimized. However, referring to FIG. 1, the signal between modems may take several paths other than the path to and from the reflector 120. For example, there is a path between modems included in STT 110a and STT 110b across the splitter 130. The multiple signal paths (i.e., multipath environment) cause distortions to the frequency response of the coaxial network 100, which may include deep nulls 505 (FIG. 5).

Figure 5:
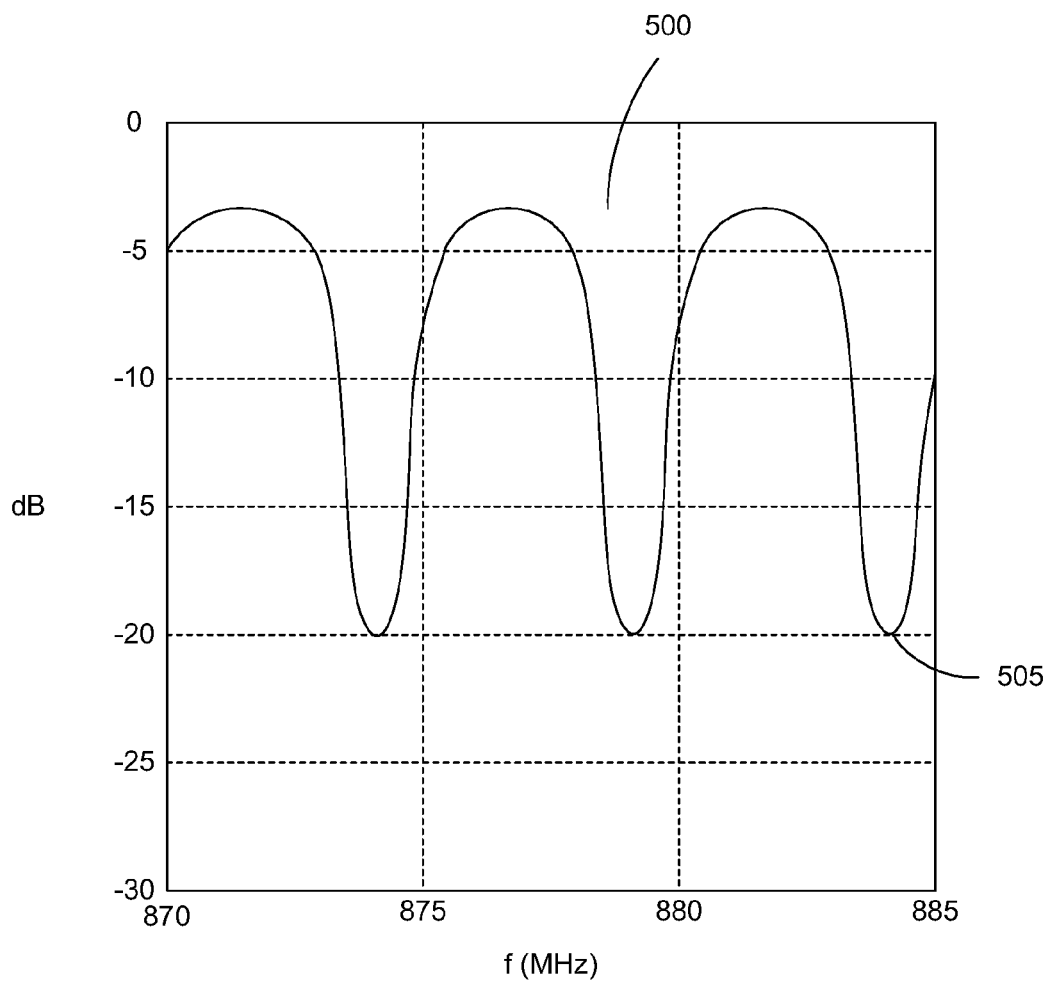
FIG. 5 is a graph illustrating a frequency response of a wideband modem in a coaxial network having a multipath environment.

FIG. 5 is a graph illustrating a frequency response 500 of a coaxial network 100 having a multipath environment. The frequency response 500 is within the full duplex wideband communications signal band. The control modem signal is not very susceptible to multipath distortion since its bandwidth is small and the modulation method is usually simple (e.g., FSK).

The present invention includes methods to optimize communication between wideband modems in a multipath environment. The methods involve optimizing the QAM signal parameters based on RF center frequency; bandwidth; and QAM constellation. The last two parameters affect the maximum data rate of the channel. When two modems 205, 210 connect for the first time, a search algorithm can be used to determine the best signal parameters for each direction of communication. For example, using an FSK signal in the control channel, modem A 205 can request modem B 210 to transmit at a given frequency. Modem A 205 can then measure the signal quality at that frequency. This is repeated at several frequencies until the optimal frequency is found. An example of a possible search sequence is shown in Table 1. Once the optimal signal parameters are found, those parameters are stored by both modems 205, 210 so that the search algorithm need not be repeated. Signal quality is determined from measurements made by the receiving modem, including one or more of the following: signal amplitude, constellation SNR (signal to noise ratio); tap values of the adaptive equalizer, and bit error rate.

TABLE 1

Example of Search Sequence for Optimal Transmit Signal Parameters

| Parameter Set | Center Frequency | Bandwidth (MHz) | Constellation | Data Rate |
|---|---|---|---|---|
| 1 | 873 | 6 | 256 | Highest |
| 2 | 874 | 6 | 256 | Highest |
| 3 | 875 | 6 | 256 | Highest |
| 4 | 876 | 6 | 256 | Highest |
| 5 | 877 | 6 | 256 | Highest |
| 6 | 878 | 6 | 256 | Highest |
| 7 | 879 | 6 | 256 | Highest |
| 8 | 873 | 6 | 64 | |
| 9 | 874 | 6 | 64 | |
| 10 | 876 | 6 | 64 | |
| 11 | 877 | 6 | 64 | |
| 12 | 878 | 6 | 64 | |
| 13 | 879 | 6 | 64 | |
| 14 | 879 | 6 | 64 | |
| 15 | 873 | 3 | 256 | |
| 16 | 874 | 3 | 256 | |
| 17 | 875 | 3 | 256 | |
| 18 | 876 | 3 | 256 | |
| 19 | 877 | 3 | 256 | |
| 20 | 878 | 3 | 256 | |
| 21 | 879 | 3 | 256 | |
| 22 | 873 | 3 | 64 | Lowest |
| 23 | 874 | 3 | 64 | Lowest |
| 24 | 875 | 3 | 64 | Lowest |
| 25 | 876 | 3 | 64 | Lowest |
| 26 | 877 | 3 | 64 | Lowest |
| 27 | 878 | 3 | 64 | Lowest |
| 28 | 879 | 3 | 64 | Lowest |

If there are several modems connected to the coaxial network 100, for example, one server modem and several client modems, the server modem may have to transmit to two or more client modems simultaneously. Considering a two-client example, it may happen that, due to multipath distortion, the frequency responses from server modem 110a to client modems 110b and 110d are not similar. In this case, the optimization of the signal parameters should take both frequency responses into account. On initial connection, each client modem performs the search algorithm described hereinabove. An integer quality score based on signal measurements is assigned to each parameter set of Table 1, with 7 equal to the highest quality. Any score above 0 indicates an acceptable quality. The signal parameter table for client modems 110b and 110d is stored in the server modem 110a. Therefore, the server modem 110a can sort the tables to find the highest scores for each client modem 110b-n. By way of example, the overall score could be calculated as: overall score=min(client 110b score, client 110d score). The result might appear as shown in Table 2. For this example, parameter set i is optimal.

TABLE 2

Example of Sorted Signal Quality Scores

| Parameter Set | Score Client Modem 110b | Client Modem 110d | Overall Score | Data Rate |
|---|---|---|---|---|
| i | 4 | 3 | 3 | Medium |
| j | 6 | 3 | 3 | Lowest |
| k | 5 | 2 | 2 | Medium |
| m | 0 | 2 | 0 | Highest |
| n | 2 | 0 | 0 | Highest |
| Etc. | Etc. | Etc. | Etc. | Etc. |

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A system for receiving a video presentation over a local network, the system comprising:
a server set-top terminal (STT) including:
a wideband modem,
a server control transmitter for providing information regarding an optimal frequency of the wideband modem, and
a control receiver for receiving information regarding the optimal frequency of a client set-top terminal wideband modem and a request for a stored video presentation from a client control transmitter of a client set-top terminal; and
the client set-top terminal (STT), comprising:
a client control transmitter for requesting the stored video presentation from the server STT and providing the information regarding the optimal frequency of the wideband modem, and
a wideband receiver for receiving the requested video presentation,
wherein the optimal frequency is determined by employing a search algorithm configured to scan multiple frequencies and select the optimal frequency for both transmitting and receiving information, the optimal frequency being stored at the client set-top terminal and the server set-top terminal.

2. The system of claim 1, wherein the received video presentation is provided to a television for viewing.

3. The system of claim 1, wherein the wideband receiver is a tuner included in the client STT, and wherein the tuner receives one of cable television signals from one of the following: a communications system and the stored video presentations from the server STT depending upon a receive switch.

4. The system of claim 1, wherein the server STT comprises: a wideband transmitter for transmitting the requested video presentation.

5. The system of claim 1, wherein the server control transmitter is further configured to: provide information to other modems in the local network regarding a transmission frequency associated with the transmitted video presentation, wherein the frequency can be in one of a high band and a low band.

6. The system of claim 1, the client STT further comprising:
a wideband transmitter for transmitting high data rate communications;
a control receiver for receiving information regarding a transmission frequency of the requested video presentation; and
a band select switch that selects between a high band and a low band depending upon the first frequency associated with the requested video presentation.

7. A set-top terminal (STT), comprising:
a client control transmitter for requesting a stored video presentation from a server STT, wherein the request includes a requesting STT address;
at least one tuner for receiving one of cable television signals and high data rate communications, wherein the high data rate communications comprises a transmitted video presentation transmitted at an optimal frequency determined by a search algorithm configured to find the optimal frequency for communicating with the server STT, the optimal frequency being stored at the STT and the server STT; and
a receive switch for receiving a routing one of the cable television signals and the high data rate communications to the at least one tuner, wherein the received video presentation is subsequently provided to a viewing device for display.

8. The STT of claim 7, wherein the STT requests the stored video presentation from a server STT in a coaxial network, the server STT comprising:
a server control receiver for receiving the optimal transmitting frequency of the wideband modem and the request for the stored video presentation;
a server control transmitter for providing information regarding the frequency in accordance with the optimal frequency in one of the high band or the low band;
a modulator for modulating the video presentation to the optimal frequency;
a wideband transmitter for transmitting the modulated video presentation, wherein the modulated video presentation includes the address of the requesting STT a band select switch;

wherein the server STT sets the band select switch to transmit the modulated video presentation in one of the high band or the low band; and wherein the server control transmitter associated with the server STT sends a control signal to a processor in the STT for setting the band select switch of the STT to receive in the server STT to one of the selected high band low band.

9. The system of claim 1, wherein the control receiver and the client control transmitter each operate on a single frequency and in a half-duplex mode.

10. The system of claim 1, wherein the control receiver receives and the client control transmitter transmits data packets as burst packages using a modulation scheme, wherein each of the burst packages include an error-detection code and a destination address.

11. The system of claim 1, wherein the client control transmitter is configured to send a message to a second client set-top terminal, the message indicating a high and a low frequency the second client set-top terminal is currently using.

12. A system for receiving a video presentation over a local network, the system comprising:
- a server set-top terminal (STT) comprising:
  - a wideband modem,
  - a server control transmitter for providing information regarding an optimal frequency of the wideband modem in one of a high band a low band, and
  - a control receiver for receiving the optimal transmitting frequency of the wideband modem and a request for a stored video presentation; and
- a client set-top terminal (STT), comprising:
  - a client control transmitter for requesting the stored video presentation from the server STT and providing the optimal frequency of the wideband modem, and
  - a wideband receiver for receiving the requested video presentation, wherein the control receiver and the client control transmitter operate on a single frequency and in a half-duplex mode,
  - wherein the control receiver receives and the client control transmitter transmits data packets as burst packages using a modulation scheme, wherein each of the burst packages include an error-detection code and a destination address,
  - wherein the client control transmitter is configured to send a message to other client set-top terminal, the message indicating a high and a low frequency the client set-top terminal is currently using,
  - wherein when the client set-top terminal and the other client set-top terminal connect the local network, a search algorithm is used to determine best signal parameters for both transmitting and receiving information between the client set-top terminal and the other client set-top terminal.

* * * * *